United States Patent
Liljenstam et al.

(10) Patent No.: US 10,219,158 B2
(45) Date of Patent: Feb. 26, 2019

(54) METHOD AND DEVICES FOR PROTECTION OF CONTROL PLANE FUNCTIONALITY

(71) Applicant: Telefonaktiebolaget LM Ericsson (publ), Stockholm (SE)

(72) Inventors: Michael Liljenstam, Sunnyvale, CA (US); Prajwol Kumar Nakarmi, Sollentuna (SE); Oscar Ohlsson, Stockholm (SE); Mats Näslund, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/119,938

(22) PCT Filed: Feb. 21, 2014

(86) PCT No.: PCT/SE2014/050213
§ 371 (c)(1),
(2) Date: Aug. 18, 2016

(87) PCT Pub. No.: WO2015/126293
PCT Pub. Date: Aug. 27, 2015

(65) Prior Publication Data
US 2017/0251370 A1    Aug. 31, 2017

(51) Int. Cl.
*H04W 12/10* (2009.01)
*H04W 12/12* (2009.01)

(52) U.S. Cl.
CPC .......... *H04W 12/10* (2013.01); *H04W 12/12* (2013.01)

(58) Field of Classification Search
CPC .............................. H04W 12/10; H04W 12/12
See application file for complete search history.

(56) References Cited

U.S. PATENT DOCUMENTS 6,769,000 B1 * 7/2004 Akhtar ................... H04L 29/06
7,079,499 B1 * 7/2006 Akhtar ................... H04L 63/08
370/310

(Continued)

FOREIGN PATENT DOCUMENTS

EP      2 557 890 A1    2/2013
WO  WO 2008/097044 A1  8/2008

(Continued)

OTHER PUBLICATIONS

International Search Report, Application No. PCT/SE2014/050213, Oct. 21, 2014.

(Continued)

*Primary Examiner* — Mehmood B. Khan
(74) *Attorney, Agent, or Firm* — Sage Patent Group

(57) ABSTRACT

This disclosure relates to methods and apparatuses for protection of control plane functionality of a network node of a communications network providing wireless communication to a mobile terminal. The network node is configured to support control plane signaling with the mobile terminal. A communication context for the mobile terminal is maintained, wherein the communication context is associated with a control signaling message exchange between the mobile terminal and the network node. One method includes establishing, for a received message, a communication context to which it belongs; determining, in relation to information in the established communication context, the received message to be a message conforming to a protection rule or a message violating a protection rule; and handling the message in accordance with rules of a protection policy. Related network nodes, computer programs, and computer program products are disclosed.

20 Claims, 18 Drawing Sheets

(56) References Cited

U.S. PATENT DOCUMENTS

| | | | |
|---|---|---|---|
| 2009/0092043 A1* | 4/2009 | Lapuh | H04L 49/552 370/228 |
| 2012/0178417 A1* | 7/2012 | Hapsari | H04W 12/04 455/411 |
| 2015/0138989 A1* | 5/2015 | Polehn | H04W 24/02 370/241 |
| 2015/0146519 A1* | 5/2015 | Zakrzewski | H04W 8/30 370/221 |
| 2016/0277956 A1* | 9/2016 | Lindheimer | H04W 36/22 |

FOREIGN PATENT DOCUMENTS

| | | | | |
|---|---|---|---|---|
| WO | WO 2009/012281 A2 | | 1/2009 | |
| WO | WO 2009012281 A2 * | | 1/2009 | H04W 12/02 |
| WO | WO-2009012281 A2 * | | 1/2009 | H04W 12/02 |
| WO | WO 2009/018318 A2 | | 2/2009 | |
| WO | WO 2011/149316 A2 | | 12/2011 | |
| WO | WO 2012/100199 A2 | | 7/2012 | |
| WO | WO 2013/135320 A1 | | 9/2013 | |

OTHER PUBLICATIONS

Written Opinion of the International Searching Authority, Application No. PCT/SE2014/050213, Oct. 21, 2014.

\* cited by examiner

METHOD AND DEVICES FOR PROTECTION OF CONTROL PLANE FUNCTIONALITY

CROSS REFERENCE TO RELATED APPLICATION

This application is a 35 U.S.C. § 371 national stage application of PCT International Application No. PCT/SE2014/050213, filed on Feb. 21, 2014, the disclosure and content of which is incorporated by reference herein in its entirety. The above-referenced PCT International Application was published in the English language as International Publication No. WO 2015/126293 A1 on Aug. 27, 2015.

TECHNICAL FIELD

The invention disclosed herein relates generally to the field of network security, and in particular to protection of control plane functionality within a wireless communication network.

BACKGROUND

An increasing interest in wireless network security, in particular within certain communities, has led to a wider spread of knowledge on how such systems work and to "hackers" working on manipulation of wireless communication devices, and further to the emergence of open source code usable to program devices for accessing some types of cellular wireless networks. This in turn introduces new threats over the wireless network air interface, in contrast to the communication devices previously having generally been trusted not to behave maliciously.

Much of this trust can be derived from the fact that network vendors, so far, largely have trusted manufacturers of the communication devices, and detailed knowledge of the technology has been limited to these communities. Nevertheless, communication devices have been known to misbehave in ways that has caused problems in the mobile network, for example communication devices sending messages causing software related issues in the wireless network. Such misbehavior has generally been attributed to misunderstandings of the technical specifications or unintentional implementation mistakes made by the manufacturers. In cases where this has happened, the network vendors have dealt with the problem by making modifications to network elements in order to deal with the problem; for instance by accommodating also the abnormal behavior. However, to do this in a timely fashion may require quick and market specific code modifications to wireless network element products. In other cases, resolution of the problem will have to wait for the next release of the product.

When addressing such security issues attention must also be paid to how attacks are to be prevented in order to maintain a proper and consistent working state of the wireless network. This is particularly an issue for a control plane of the wireless network, since manipulations to control plane signaling messages could potentially have highly undesirable effects if not handled carefully. For instance, in order to stop an attack certain malicious messages may have to be prevented from reaching a network function, and to simply remove the malicious messages could potentially have undesired effects. A simple example of this is the case where an underlying transport layer incorporates reliable transmission, e.g., using retransmission in order to ensure data to be reconstructed even in case of packet losses. In such case, removing the message would cause retransmissions on the transport layer and might thus interfere with all communications between the end points.

Published document WO2013/135320A1 addresses the above issue of communication devices sending large numbers of specific signaling messages. A mechanism is described integrated into a Serving GPRS Support Node/Mobility Management Entity (SGSN/MME) node for detecting when a communication device is stuck in a loop of transmitting certain request messages and receiving reject messages, and signaling to the communication device to abort such loop. In particular, the SGSN/MME node monitors results of interactions with communication devices that lead to reject messages, counts the reject messages and if the count exceeds a configurable threshold, it sends a message to the communication device to cease.

However, such a mechanism does not protect message interpretation logic of the network node itself against malformed traffic and is limited to the protocol layers terminated in one particular node. Moreover, attacks or otherwise harmful traffic may come in many forms, necessitating flexibility. The need for flexible protection measures has been recognized in, e.g., Transmission Control Protocol/Internet Protocol (TCP/IP) networks. For instance, typical Internet firewalls, Network Intrusion Prevention Systems (NIPS), SIP Border Gateway Controllers, or Web Application Firewalls (WAF), provide rule-based mechanisms to protect against network attacks. However, the requirements for such TCP/IP networks differ from the requirements for wireless networks, e.g., due to other protocols being used and also since mobile-specific node behavior needs to be taken into account in order to maintain system consistency. Principles found in these types of systems are thus not directly applicable for security issues in the wireless networks air interface signaling protocols, if applicable at all.

In cases of intentional attacks it is important to be able to respond very quickly, which is rendered difficult when analysis of the impact of product modifications has to be performed, as well as designing of a modification, testing, and then releasing the product. Therefore, it would be desirable to be able to quickly deploy protection of wireless networks in a flexible manner, in particular for different types of issues that may arise, such as, e.g., various malicious attacks but also other anomalies that may occur. The mentioned patent publication provides a well-functioning solution for the particular problem addressed, but there is a desire and need for increased flexibility and protection of the signaling mechanisms interacting with the communication device.

SUMMARY

Existing systems that offer flexible protection in the TCP/IP domain are thus not directly applicable for the wireless communication system, e.g., since the protocols that they operate on are different from the protocol stacks of wireless networks. As a specific example, the existing systems do not address how to perform security detection within communication contexts in wireless communication system signaling, wherein there is the highly likely possibility of mobility of the communication devices (denoted mobile terminals in the following) in the system. Moreover, they do not address how to maintain a consistent working state in the wireless communication network, also denoted mobile system, when manipulating the signaling to prevent attacks.

An object of the present invention is to solve or at least alleviate at least one of the above mentioned problems.

The object is according to a first aspect achieved by a method for protection of control plane functionality of a network node of a communications network providing wireless communication to a mobile terminal. The network node is configured to support control plane signaling with the mobile terminal. The method comprises: maintaining a communication context for the mobile terminal, the communication context being associated with a control signaling message exchange between the mobile terminal and the network node; establishing, for a received message, a communication context to which it belongs; determining, in relation to information in the established communication context, the received message to be a message conforming to a protection rule or a message violating a protection rule; and handling the message in accordance with rules of a protection policy.

The method provides a protection function in mobile communications network nodes for flexible protection against signaling attacks coming over the air interface. By the provision of such a flexible protection function, comprising flexible means for handling security issues on the air interface, a faster protection against malicious attacks and also unintentional errors is enabled, resulting in increased network uptime. Further, the developers of wireless network element products are given more time to develop permanent solutions for problems discovered in the communication networks. This allows for improved code quality and reduced need for handling market-specific temporary versions of the products. The messages are handled in accordance with a protection policy, which may be set by the operator of the communications network. This enables the operator to ensure that the messages are handled so as not to disturb ongoing communication in the network.

The object is according to a second aspect achieved by a first network node of a communications network providing wireless communication to a mobile terminal. The communications network comprises a second network node configured to support control plane signaling with the mobile terminal. The first network node comprises a processor and memory, the memory containing instructions executable by the processor, whereby the first network node is operative to: maintain a communication context for the mobile terminal, the communication context being associated with a control signaling message exchange between the mobile terminal and the second network node; establish, for a received message, a communication context to which it belongs; determine, in relation to information in the established communication context, the received message to be a message conforming to a protection rule or a message violating a protection rule; and handling the message in accordance with rules of a protection policy.

The object is according to a third aspect achieved by a computer program for a first network node for protection of control plane functionality of a second network node of a communications network providing wireless communication to a mobile terminal. The second network node is configured to support control plane signaling with the mobile terminal. The computer program comprises computer program code, which, when run on the first network node causes the first network node to: maintain a communication context for the mobile terminal, the communication context being associated with a control signaling message exchange between the mobile terminal and the second network node; establish, for a received message, a communication context to which it belongs; determine, in relation to information in the established communication context, the received message to be a message conforming to a protection rule or a message violating a protection rule; and handle the message in accordance with rules of a protection policy.

The object is according to a fourth aspect achieved by a computer program product comprising a computer program as above, and a computer readable means on which the computer program is stored.

The object is according to a fifth aspect achieved by a first network node of a communications network providing wireless communication to a mobile terminal and comprising a second network node being configured to support control plane signaling with the mobile terminal. The first network node comprises: means for maintaining a communication context for the mobile terminal, the communication context being associated with a control signaling message exchange between the mobile terminal and the second network node; means for establishing, for a received message, a communication context to which it belongs; means for determining, in relation to information in the established communication context, the received message to be a message conforming to a protection rule or a message violating a protection rule; and means for handling the message in accordance with rules of a protection policy.

Further features and advantages of the present invention will become clear upon reading the following description and the accompanying drawings.

DETAILED DESCRIPTION

Figure 1:
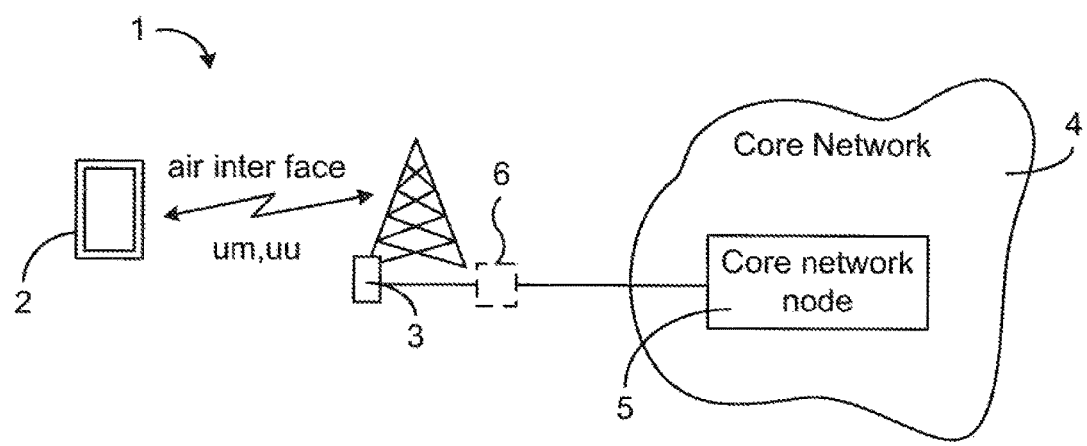
FIG. 1 schematically illustrates an environment in which embodiments of the present invention may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present invention encompasses methods, mechanisms and devices required for introduction of new protection functionality into network nodes of a communication network for flexible protection against signaling attacks coming in over the air interface. Such methods and mechanisms encompass inter alia the following aspects:

Tracking information about communication context in order to be able to scope inspection of message exchanges. As is known within the technical field of the present application, "scoping" comprises determining whether received messages relate to one another, for instance as in a request/response exchange or as a sequence of signaling procedures related to a particular mobile terminal. To elaborate further, the communication contexts used in embodiments of the present invention for security inspection serve to hold state about ongoing signaling message exchanges. This may comprise, for instance, information representing which messages have been observed in a sequence, mappings to identifiers representing subscriber or mobile terminal, or statistical aggregates on numbers of messages of certain types or with certain content.

This involves protocols for Global System for Mobile communications/General Packet Radio Service (GSM/GPRS) such as for example Link Access Protocol on Dm Channel (LAPDm), Medium Access Control (MAC), Radio Link Control (RLC), Signaling Connection Control Part (SCCP), Message Transfer Protocol 3 (MTP3), MTP3 User Adaptation Layer (M3UA), Radio Resource (RR), Connection Management (CM), Mobility Management (MM), Logical Link Control (LLC), Sub Network Dependent Convergence Protocol (SNDCP), Base Station Subsystem Application Part (BSSAP), Direct Transfer Application Part (DTAP); for Universal Mobile Telecommunications System (UMTS), protocols such as Medium Access Control (MAC), Radio Link Control (RLC), Packet Data Convergence Protocol (PDCP), Mobility Management (MM), Unified Mobility Manager (UMM), GPRS Mobility Management (GMM), Session Management (SM), Call Control (CC), Supplementary Services (SS), Short Message Service (SMS), Message Transfer Protocol (MTP), SS7 MTP3 User Adaptation Layer (M3UA), Signaling Connection Control Part (SCCP), Radio Access Network Application Part (RANAP), Direct Transfer Application Part (DTAP); for Long Term Evolution (LTE), protocols such as Medium Access Control (MAC), Radio Link Control (RLC), Packet Data Convergence Protocol (PDCP), Radio Resource Control (RRC), Internet Protocol (IP), Stream Control Transmission Protocol (SCTP), Non-Access Stratum (NAS); and similar future protocols exposed over the air interface and that require information in transport protocols.

Further, the tracking also comprises tracking of communication contexts under mobility. That is, tracking changes of node, channel, and other identifiers for a communication context for a particular mobile terminal due to its mobility. Communication contexts for scoping may also be formed by joining multiple smaller contexts for the same mobile terminal, or across mobile terminals, to form meta communication contexts.

Making use of communication context information when inspecting message exchanges to detect malicious or problematic messages or message sequences.

This comprises both malformed content of messages and malformed sequences of (either correct or malformed) messages. Messages or sequences of messages may be malformed syntactically, semantically or with respect to elapsed time (for instance, in terms of rate of messages).

Rewriting messages or sequences of messages to preserve correct working state of network.

The working state of the network (or state across mobile terminals and network) may not tolerate outright removal/dropping of messages, so the communication flow may need to be modified in other ways, e.g., modification or replacement of messages, or may need changes to sequences of messages.

Optional integration of mechanisms in mobile network nodes, such as post-decryption and pre-message parsing and handling.

FIG. 1 schematically illustrates a wireless communications network 1 in which embodiments of the present invention may be implemented. The wireless communications network 1 comprises a number of mobile terminals 2 (only one illustrated). As a note on terminology, a mobile terminal for wireless communication may be denoted in a number of different ways, e.g., as terminal, user device, mobile station, communication device, user equipment, etc. The mobile terminal may be denoted differently depending on the communication system at hand (and in particular the radio access technology used). For example, the mobile terminal is often denoted mobile station (MS) in a GSM or WiMAX system, while it is denoted user equipment (UE) in an LTE system and UMTS. In the following description, a device for wireless communication is denoted mobile terminal 2 throughout, irrespective of type of communication system. In the figures though, the vocabulary related to the particular radio access technology at hand is adhered to.

The wireless communications network 1 further comprises a first type of network nodes 3 that communicate with the mobile terminals 2, in particular over an air interface, e.g., Um in a GSM communications network, or Uu in an LTE or UMTS communications network. This first type of network nodes 3 may be referred to as access nodes, radio base stations (RBS), base stations (BS), base transceiver stations (BTS) (in GSM) or evolved Node Bs (eNB) (in LTE) or NodeB (in UMTS), and they enable wireless communication for the mobile terminals 2 residing within a coverage area corresponding to one or more particular geographic areas. Such coverage areas may be denoted in different ways, e.g., referred to as cells or sectors. The first type of network nodes 3 (in the following also denoted access nodes 3) are then connected further to a core network 4, comprising a second type of network nodes 5, which in the following are also denoted core network nodes 5. The core network 4 typically comprises various network nodes, and the core network nodes 5 may comprise different nodes depending on the type of wireless communications network 1. For example, for GSM, the core network nodes 5 of the core network 4 may comprise, e.g., Mobile Switching Center (MSC). For LTE, the core network nodes 5 of the core network 4 comprise, e.g., Mobility Management Entity (MME) and Serving GPRS Support Node (SGSN). Embodiments of the present invention will be described for various such wireless communication systems 1, e.g., GSM, LTE, UMTS, and WiMax. The communication network 1 may comprise a third type of network node 6, controller nodes, which for GSM would be a Base Station Controller (BSC) and for UMTS the radio network controller (RNC). LTE lacks nodes corresponding to such controller node 6, the controller node 6 hence being indicated by dashed lines as optional. It is noted that there are a number of nodes within a communication network in which embodiments of the present invention may be implemented, and that may not fall within the given categorization of first, second and third types of network nodes. It is further noted that although described for various particular communication systems, embodiments of the invention for still other communication systems may be envisaged.

Figure 2:
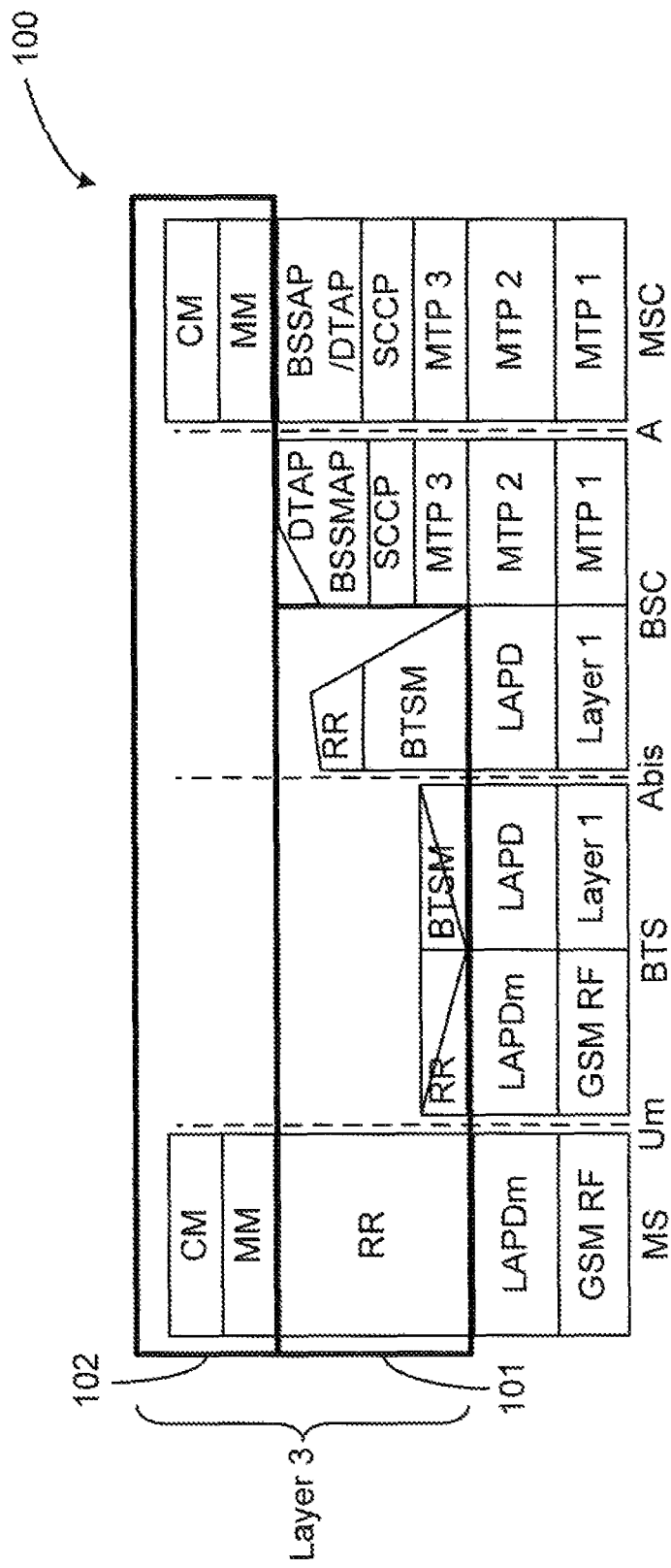
FIG. 2 illustrates a GSM control plane protocol stack.

FIG. 2 illustrates a GSM control plane protocol stack 100 for the circuit switched (CS) domain prior to introduction of IP-based transport, e.g., Abis-over-IP. Among other tasks, the control plane handles radio-specific functionality. Examples of such other tasks comprise allocation of resources (including radio resources), exchange of control information for mobility handling and call handling, security procedures and other non-user data related tasks. The control plane defines a set of protocols for controlling connections between mobile terminals (denoted MS in the figure) and the BTS (access node 3), i.e., traffic channels, by means of control signaling, comprising, e.g., connection setup. The interface Um between the mobile terminal 2 and the BTS, the interface Abis between the BTS and a BSC and the interface A between the MSC and the BSC are indicated in the FIG. 2 by a respective vertical dashed line.

For the GSM control plane protocol stack 100, the Radio Resource (RR) protocol, which is a sublayer of Mobile radio interface Layer 3 (also denoted L3), is terminated in the BSC, while connection management (CM) and mobility management (MM) sublayers are terminated in the MSC. The RR protocol is included in the lower box 101 of FIG. 2 and the CM and MM sublayers are included in the upper box 102 of FIG. 2. In GSM, encryption is terminated early, namely in the BTS. When the encryption is terminated in this way, i.e., when there is an interface between two network nodes involved in the control plane related signaling that could be attacked, and wherein the interface is accessible, a protection function may, in accordance with an embodiment of the present invention, be implemented as a standalone node. The interface is for example accessible wherever it is not encrypted. In particular, such standalone node may be implemented on the A interface in order to protect the MSC, or on the Abis interface in order to protect the BSC and optionally also the MSC.

Figure 3:
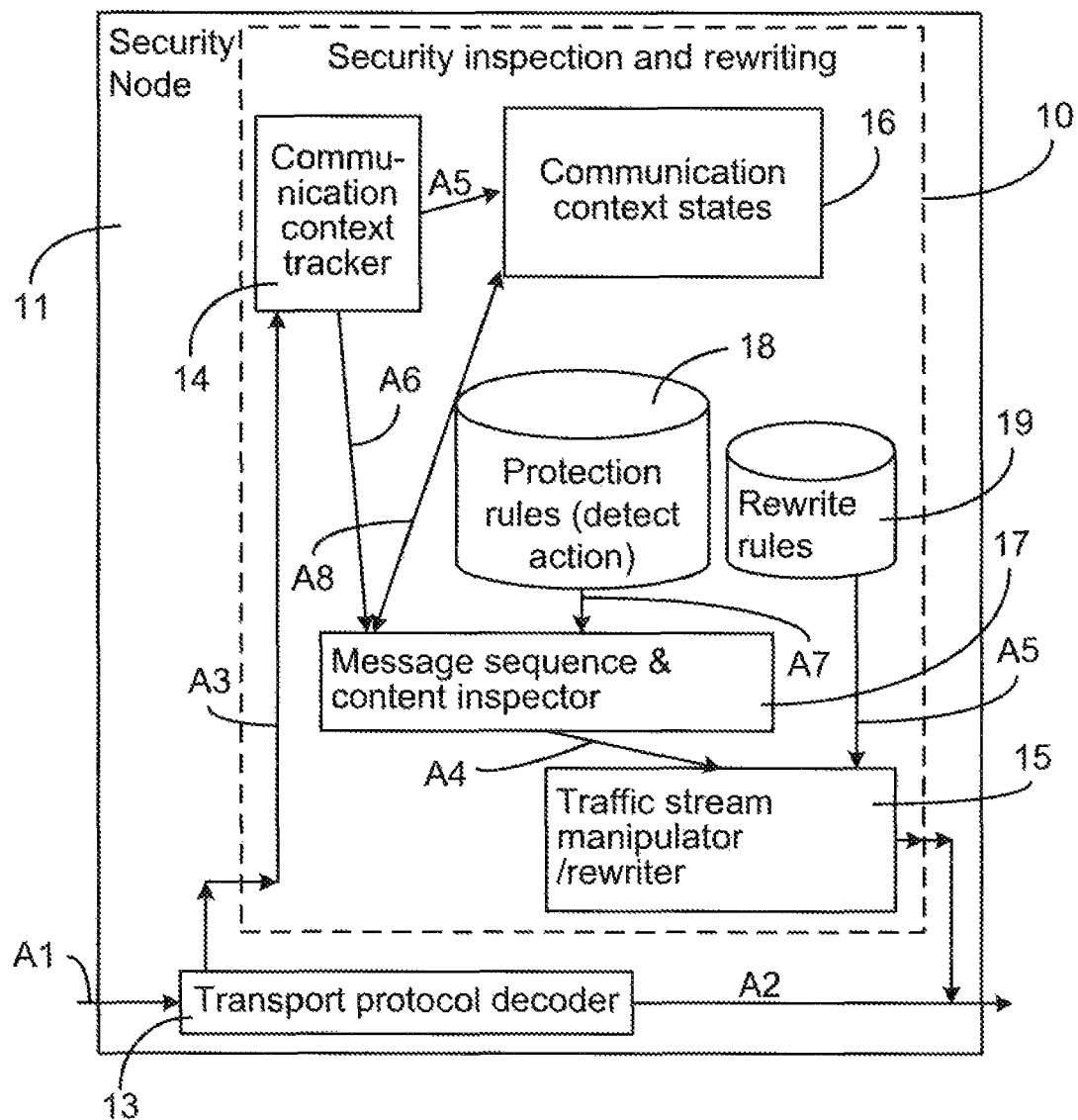
FIG. 3 illustrates an embodiment of the present invention implemented in a standalone node.

FIG. 3 illustrates an aspect of the present invention implemented in such a standalone node. In particular, a security function 10 protecting the control plane from malicious or otherwise problematic air interface signaling is implemented in a security node 11. It is noted that mobile communication systems such as GSM, LTE, etc., already perform certain built-in security function for user and control plane, e.g., encryption and integrity protection. In situations wherein the present security function 10 is integrated into the same node that performs the existing built-in security functions (e.g., decryption) it will in most cases be necessary to apply the security function 10 after the built-in security functions (e.g., deciphering) have been performed.

In particular, FIG. 3 illustrates a security function 10 comprising inspection and rewriting functionality, provided in the security node 11. Messages of layers relevant for inspection in view of security are first exposed by parsing of the underlying transport protocols. This parsing may be performed in a conventional transport protocol decoder 13, which receives various messages (indicated by ingoing arrow A1). As the control plane is to be protected, relevant parts for GSM would be Layer 3 messages. Messages that do not contain relevant parts are directly forwarded without further processing, which is indicated by the rightmost outgoing arrow A2 from the transport protocol decoder 13. For example, layer 2 messages, i.e., messages of the data-link layer, without any higher layer encapsulated data (e.g., pure acknowledgements or keep-alive messages) would not be relevant for inspection and are thus forwarded to the next node. For instance, for the Abis interface of GSM this node would be BSC or BTS, depending on direction of messages.

The messages to be inspected (Layer 3 messages together with transport-layer information in case of GSM) are passed to a communication context tracker 14, as indicated by arrow A3.

The communication context tracker 14 inspects the messages (described later) and then passes the messages along with associated communication contexts (arrow A6) on to a message sequence and content inspector 17. The message sequence and content inspector 17 inspects the messages by referring to the associated communication contexts and protection rules (described later) and then passes the messages along with possible modification actions (arrow A4) on to a traffic stream manipulator/rewriter 15. The traffic stream manipulator/rewriter 15 may be configured to fetch or receive (arrow A5) rules from a first database 19 comprising, e.g., rewrite rules entered by the network operator. The traffic stream manipulator/rewriter 15 may also be configured to receive, from the message sequence and content inspector 17, modification actions. The modification actions in turn are received by the message sequence and content inspector 17 from a third database 18 comprising the mentioned protection rules. This handling performed by the traffic stream manipulator/rewriter 15 will be described more in detail later, e.g., with reference to FIG. 5.

For the purposes of this description, a protection policy is intended to comprise a plurality of protection rules, against which traffic is checked and acted upon, and a plurality of rewriting rules. Thus, a protection rule comprises a conformance part, specifying what to detect, and an action part, specifying what action to take to non-conforming traffic. Actions may include rewriting of messages, in which case rewrite rules may optionally be used to describe specific rewriting actions to take, if not described in the protection rule action part itself.

The communication context tracker 14 is configured to track map all messages to a communication context belonging to a certain mobile terminal 2, and where appropriate create new communication contexts, delete existing communication contexts or modify communication contexts. For this end, the communication context tracker 14 may use a second data storage 16, e.g., fetching or receiving the communication contexts for the mobile terminal 2 therefrom (indicated by arrow A5). The second data storage 16, comprising, e.g., non-persistent memory, may thus comprise communication context states for different mobile terminals. The tracking is described more in detail later with reference, e.g., to FIG. 4. The communication context tracker 14 may use an inspection process as illustrated in FIG. 5 to inspect all messages passed to it (from the transport protocol decoder 13) and to maintain a set of active communication contexts.

All messages along with a mapping to their respective communication context, that is, a particular mobile terminal 2, are next provided (arrow A6) to a message sequence and content inspector 17. The message sequence and content inspector 17 may be configured to fetch or receive (arrow A7) rules relating to protection policies defined by the network operator. Such rules may be stored in a third database 18 comprising protection rules, which the network operator thus has defined and entered into the third database 18, e.g., rules as to which messages to detect and what action to take for a certain type of message. It is noted that this third database 18 (or other storage form) may be swiftly updated by the operator, who is thus enabled to quickly respond to, e.g., malicious attacks by including, in the database 18, protection rules for identification of this type of malicious attacks. Allowing for faster protection against malicious attacks and also unintentional errors result in an improved network uptime (i.e., percentage of time the overall network is accessible to its users).

Finally the traffic stream manipulator/rewriter 15 is configured to handle the messages that it receives in accordance with instructions received from the message sequence and content inspector 17 and, optionally, a set of rewrite rules, e.g., fetched or received from the first database 19. It may for example be configured to rewrite a message so as to preserve a correct working state of the network, e.g., by rewriting parts of the message or rewrite it so as to comprise an empty message.

When a mobile terminal 2 is attached to the communications network 1, a communication context is established for the mobile terminal 2. The exact circumstances for creating a communication context will depend on the system type and the location of the security function in the network. Incoming messages are mapped to its communication context using a communication context identifier, which may be constructed by combining different identifiers extracted from the lower layer protocols. The particular identifiers which are used in the construction depends on the radio access technology, the type of control signaling that is analyzed, as well as the location of the security function. A few examples comprise: for GSM and security function 10 located between BTS and BSC: communication context identifier may be constructed from BSC, BTS, and TRX identifiers together with the timeslot number and sub-channel number of the dedicated radio channel; for LTE and security function 10 integrated with eNB: communication context identifier may be constructed from C-RNTI; for LTE and security function 10 integrated with MME: communication context identifier may be constructed from SCTP association identifier, eNB UE S1AP ID, and MME UE S1AP ID; for UMTS and security function 10 integrated with RNC: communication context identifier may constructed from SCTP association identifier, NodeB Communication Context ID and CRNC Communication Context ID (CRNCCC-ID). A communication context may also be identified using an identifier of a mobile terminal, e.g., IMEI, or by an identifier of a subscription, e.g., IMSI.

For GSM as the Radio Access Network (RAN), the communication context tracker 14 may be configured to associate communication context with RR-sessions. An RR-session in GSM is the association that exists between the mobile terminal 2 and the communications network 1 while the mobile terminal 2 is in the dedicated mode. To group messages according to the RR-session that they belong to thus comes natural and allows the security node 11 to detect attacks that consists of more than one message, which will be described more in detail later.

Figure 4:
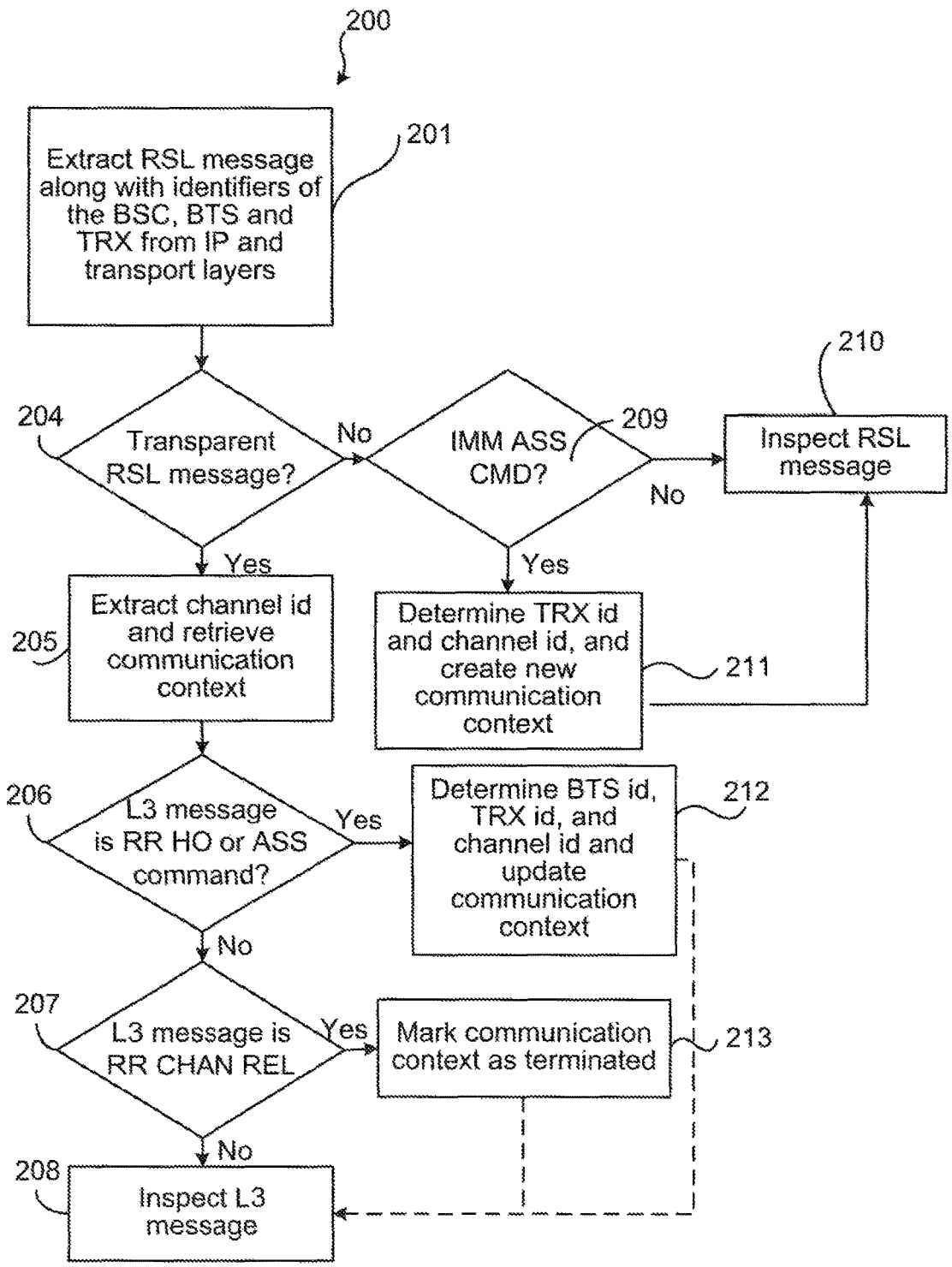
FIG. 4 is a flow chart of tracking of communication contexts in GSM CS in accordance with an embodiment of the present invention.
Figure 5:
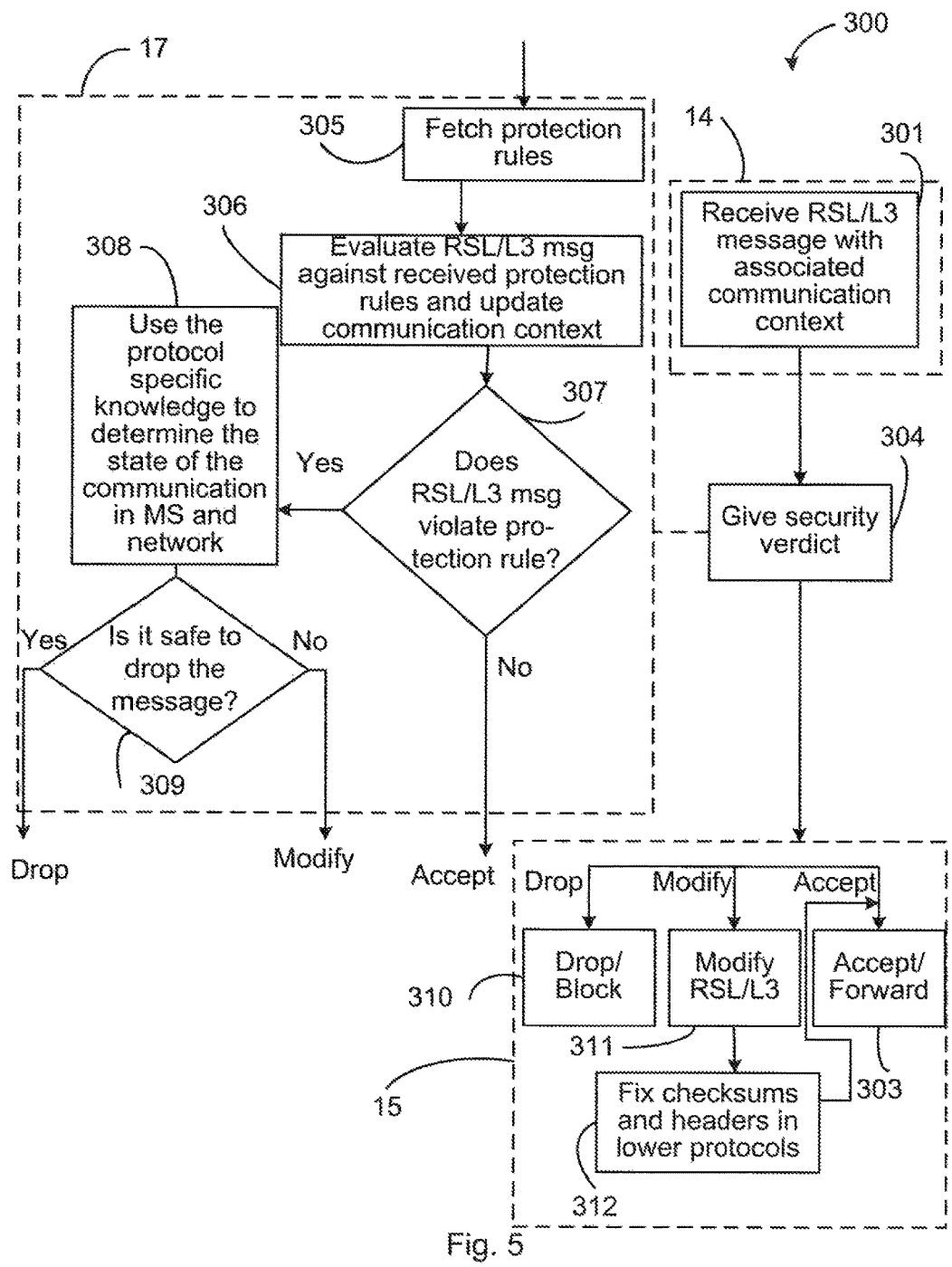
FIG. 5 is a flow chart of security inspection and traffic modification in GSM CS in accordance with an embodiment of the present invention.

FIG. 4 is a flow chart of tracking of communication contexts in GSM CS domain in accordance with an embodiment of the present invention. In particular, FIG. 4 illustrates how a communication context may be determined for an enveloped Layer 3 message sent over the Abis interface (refer to FIG. 2) for the case of Abis-over-IP. The inspection process 200 starts in box 201, wherein the communication context tracker 14 extracts RSL messages along with identifiers of the BSC, BTS and TRX from IP- and transport layers. Next, in box 204, the communication context tracker 14 will check if the RSL message is a transparent RSL message. If this is the case, the enveloped Layer 3 message (i.e., RR, MM or CC message) and the channel ID, which comprises channel type, subchannel nr, and timeslot, will be extracted (box 205). The channel ID together with the IDs of the BSC, BTS, and TRX uniquely identifies the communication context, which may thus be retrieved.

To be able to map Layer 3 messages to communication contexts, the communication context tracker 14 also needs to keep track of when a new user session is created or when the radio channel of an existing user session is moved to new cell (i.e., it must be able to handle mobility), or is reconfigured, or if the user session ends. In these cases, corresponding communication contexts need to be created, deleted or the communication context identifier must be updated. In FIG. 4, box 204, if the message is not a transparent RSL message, i.e., if it is a non-transparent RSL message (sent between the BSC and BTS), the flow continues to box 209. In box 209, if the received non-transparent RSL message comprises a RSL IMMEDIATE ASSIGNMENT message a new communication context is created (box 211) by determining TRX ID and channel ID. If, in box 209, the non-transparent message is other than the RSL IMMEDIATE ASSIGNMENT message the flow continues to box 210, wherein the communication context tracker 14 passes the message on to the message and sequence and content inspector 17 When, in box 205, the communication context has been retrieved, the Layer 3 message is inspected. In box 206, if the Layer 3 message is either an RR HANDOVER COMMAND (inter or intra cell handover), or an RR ASSIGNMENT COMMAND (intra cell handover), then a handover is detected. That is, a handover can be determined from detecting either one of these two messages. In both cases the communication context identifier is updated, box 212, by extracting a new channel ID and, possibly, determining a new TRX ID, BTS ID, and BSC ID.

If the Layer 3 message is neither a RR HANDOVER COMMAND nor a RR ASSIGNMENT COMMAND, the flow continues to box 207. If, in box 207, it is determined that the Layer 3 message is an RR CHANNEL RELEASE message, then the communication context is marked as terminated (box 213). If, in box 207, it is determined that the Layer 3 message is not an RR CHANNEL RELEASE either, then the Layer 3 message may be inspected taking into account the information in the communication context.

An overall process for handling a message after transport layer decoding is illustrated in FIG. 5. In particular, FIG. 5 illustrates a method 300 for performing message sequence and content security inspection 17 (compare FIG. 3), and modification/rewriting 15 (again, compare FIG. 3).

A decoded transport layer message with associated communication context is received in box 301. Next, the flow continues to box 304, wherein a security verdict is given for the message. This may be performed in accordance with what is illustrated in box 17 (dashed lines). Next, in box 305, protection rules are fetched, e.g., from a database (compare third database 18 of FIG. 3). Such protection rules may be entered and kept updated by an operator of the communications network 1. The operator is thus enabled to respond quickly to e.g. intentional attacks that have been detected, by swiftly updating the policies with e.g. known malicious messages or message sequences. In box 306, the protection rules are used to evaluate the received message RSL/L3 together with the information in the communication context, and this may result in updates to the information in the communication context. Examples of updates are described hereinafter.

In box 307, the evaluation performed in box 306 is used to determine if the message or message sequence violates any of the protection rules. That is, by referring to the relevant communication context (in this case, RR session and/or subscriber identifiers and other state information) for the message and defined protection rules it is determined whether there is a (potential) security violation. Each protection rule is evaluated within the scope of the communication context. The communication context provides the necessary state information to track sequences or combinations of events and ensures that different rules do not trigger across, for instance, the communications of different users. The communication contexts may be seen as serving two purposes: a primary one being to limit the scope so that messages belonging, e.g., to different users are not mixed up and to store state representing, e.g., intermediate results of the inspection process; a second one being to limit the amount of state of message exchanges needed to be kept, e.g., by discarding state when ending a communication context. It would be unfeasible to track all combinations of interactions and for all time.

As mentioned earlier, a protection rule comprises a conformance part, specifying what to detect, and an action part, specifying what action to take to non-conforming traffic. The conformance part of a protection rule may comprise, but is not limited to:

a description of the content of a message or part of a message, such as described for instance by a bit- or byte-pattern or regular expression;
  the length or similar properties of the message;
  a description of a sequence of messages and their content irrespective of exact time points, such as described for instance by a regular expression over messages or some other type of message sequence/pattern matching state machine;
  a description of a sequence of messages and their content with reference to elapsed time, such as described for instance by a state machine with timers or by programmatic instructions to track messages and elapsed time, or statistical descriptions of the process of observed messages;
  or any combination of the above.

Hence, the conformance part of the protection rule may, for example, define various message patterns that are considered to constitute unsafe traffic, e.g., suspected to be derivable from (or be signs of) a malicious attack. If the message under inspection, i.e., the message which is to be given a security verdict, has a message pattern that falls under this particular protection rule, a violation of the protection rule is detected. As another particular example, the protection rule may define a range or statistical parameters, and the message under inspection may be determined to violate the protection rule if a message pattern of the message falls outside the range.

Intermediate results (state) for the protection rule matching process can be stored as information in the communication context. Thus, updates to this state information in the communication context (as previously mentioned) may be required during checking of messages or sequences of messages against the protection rules.

If the message does not violate any protection rule, the verdict given in box 304 is to accept the message and the flow continues to box 303. If on the other hand, the message is found to violate a protection rule, the flow continues to box 308. In box 308, a protocol specific knowledge is used to determine the state of the communication in the mobile terminal 2 and the communications network 1 (e.g., node such as BTS, BSC, MSC). Examples of protocol specific knowledge may comprise knowledge about underlying retransmission mechanisms or timers governing actions to take if a certain message is not received. In such cases, dropping a message may lead to undesirable effects, such as retransmissions of messages or unanticipated system responses, and the preferred action may be to modify the message. The flow then continues to box 309. Based on the outcome of the application of the protection rules in box 307 and 309, one of three possible verdicts is given (compare box 15), for the message:

Accept—this was not a security violation and the message is passed on (box 303) for forwarding. In this case the traffic stream manipulator/rewriter 15 does not need to take any action.
  Drop—a security violation was detected (based on the policy) and the policy in the protection rule for handling this violation states that the acceptable action is to drop the message. In this case the traffic stream manipulator/rewriter 15 will drop the packet from the communication stream, box 310.
  Modify—a security violation was detected (based on the policy), but in order to maintain a correct state in the communications between the wireless communication system and the mobile terminal 2 (or between different network elements of the core network 4) the message must be modified according to the specified policy, rather than being dropped. In this case the traffic stream manipulator/rewriter 15 will modify, in box 311, the RSL/L3 message (according to policy) before passing it on for forwarding (i.e., to box 303). An example of such a modification is to remove or replace a part of the message.

Details on how to perform such a modification can be encoded either in the protection rule (i.e., the protection rule describes both how to detect and rewrite), or the protection rule may only say "protect by rewriting". In the latter case, the type of modification to perform may either be fetched from a rewriting rule storage, based on the type of message or message sequence to remove, or it may be encoded in the Traffic Stream manipulator/rewriter 15 itself.

In the case of a modification, the traffic stream manipulator/rewriter 15 may also be responsible for updating other fields or parts of the packet/message that follow from the modification of the message. Typical examples of this comprise length fields and check sums in the underlying transport protocol headers. Such updating of fields or parts of the message may be performed (box 312), after which the message is input to box 303 for forwarding.

The described protection function may, for GSM CS domain implementation, be implemented in front of the core network 4. That is, implemented so as to protect the CS core network nodes comprising e.g. the MSC. Such implementation in front of the core network 4 may be either in the form of a stand-alone node such as the security node 11, or be integrated into one of the core network nodes 5. In contrast to prior art, signaling messages originating from the mobile terminal 2 on the A interface are then transmitted using the Direct Transfer Application Part (DTAP) protocol which is transported over SCCP and MTP3 or M3UA (for TDMA and IP transport, respectively), refer to FIG. 2. In this case the relevant mobile terminal 2 may be identified by a combination of the BSS identified by the MTP point code, and the mobile terminal 2 within the BSS identified at the SCCP layer by source/destination local reference [reference is also made to 3GPP Technical Specification GSM 08.06]. It is noted that, although not described herein, embodiments of the present invention are also applicable for the GSM Packet Switched (PS) domain.

As mentioned earlier, embodiments of the present invention may be implemented in and for different wireless standards, and an implementation in LTE is described next.

Figure 6:
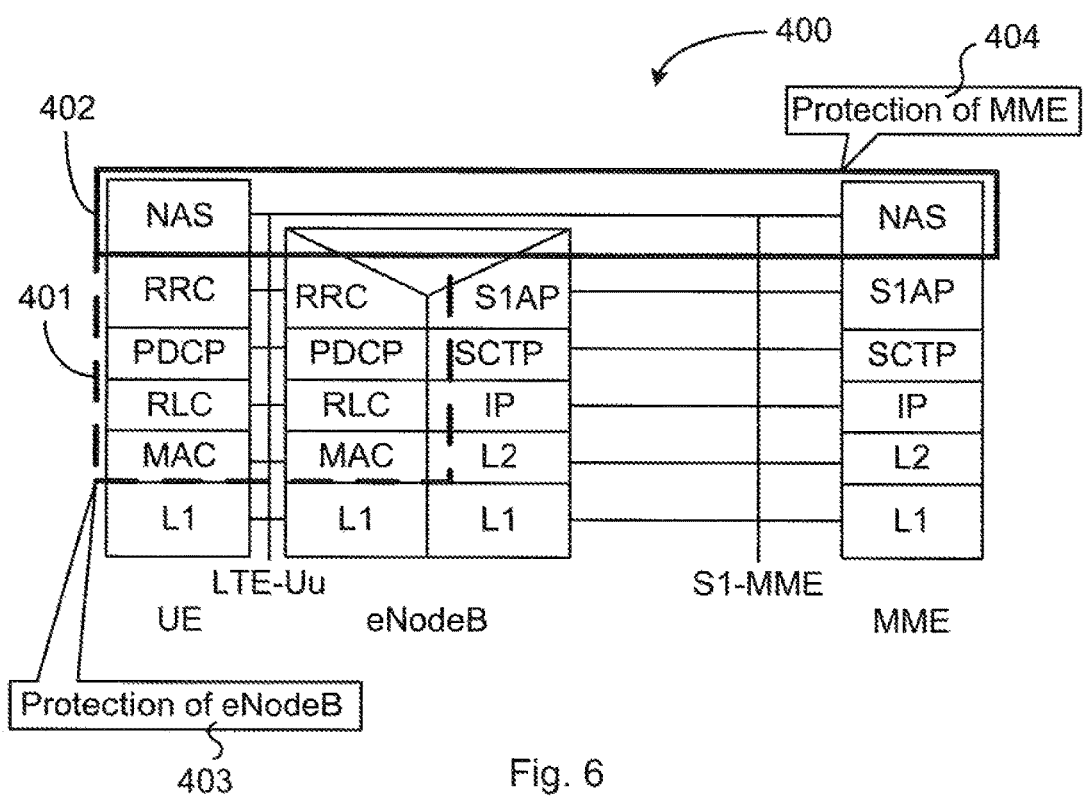
FIG. 6 illustrates an LTE control plane protocol stack.

FIG. 6 shows an LTE control plane protocol stack 400 for the eUTRAN and the LTE air interface Uu. From FIG. 6, it can be seen that the non-access stratum (NAS) protocol is terminated in the MME (being one example of a core network node 5), as indicated by box 402. The access stratum (AS) protocols up to RRC layer are terminated in the eNodeB (being an access node 3), as indicated by box 401 (dashed lines). Therefore, to protect the eNodeB, the security function needs to be integrated into the eNodeB to be able to inspect AS protocols. Because of encryption of the NAS communications between the mobile terminal 2 (denoted UE in the figure) and the MME, most of the control plane protection of the MME needs to be integrated into the MME. It is noted that there are few unencrypted messages that could be inspected before reaching the MME, e.g., in the eNodeB.

Figure 7:
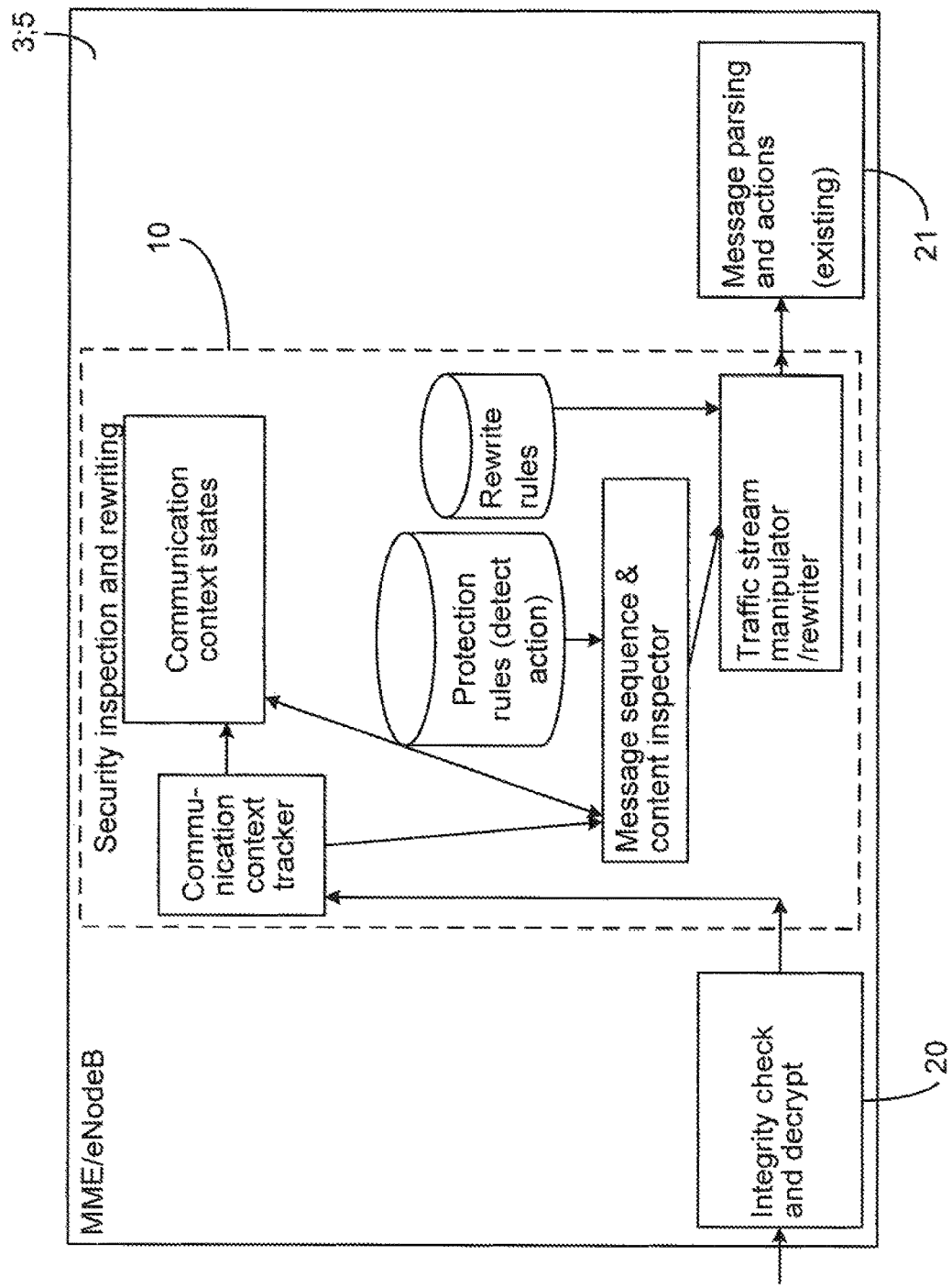
FIGS. 7 and 8 illustrate an embodiment of the present invention integrated into an existing node.

FIG. 7 illustrates an arrangement for how the security function 10, comprising the earlier described security inspection and rewriting function, may be integrated into an existing node 3, 5, 6 after the decryption and integrity check stage (indicated by box 20), but prior to the conventional message decoding and handling (indicated by box 21). Thus, as illustrated in FIG. 7, the security function 10 may be integrated in the eNodeB (as illustrated in FIG. 6, by box 403) to protect the eNode at the AS layers, and it may also be integrated into the MME (as illustrated in FIG. 6, by box 404) to protect the MME as the NAS layer.

Figure 8:
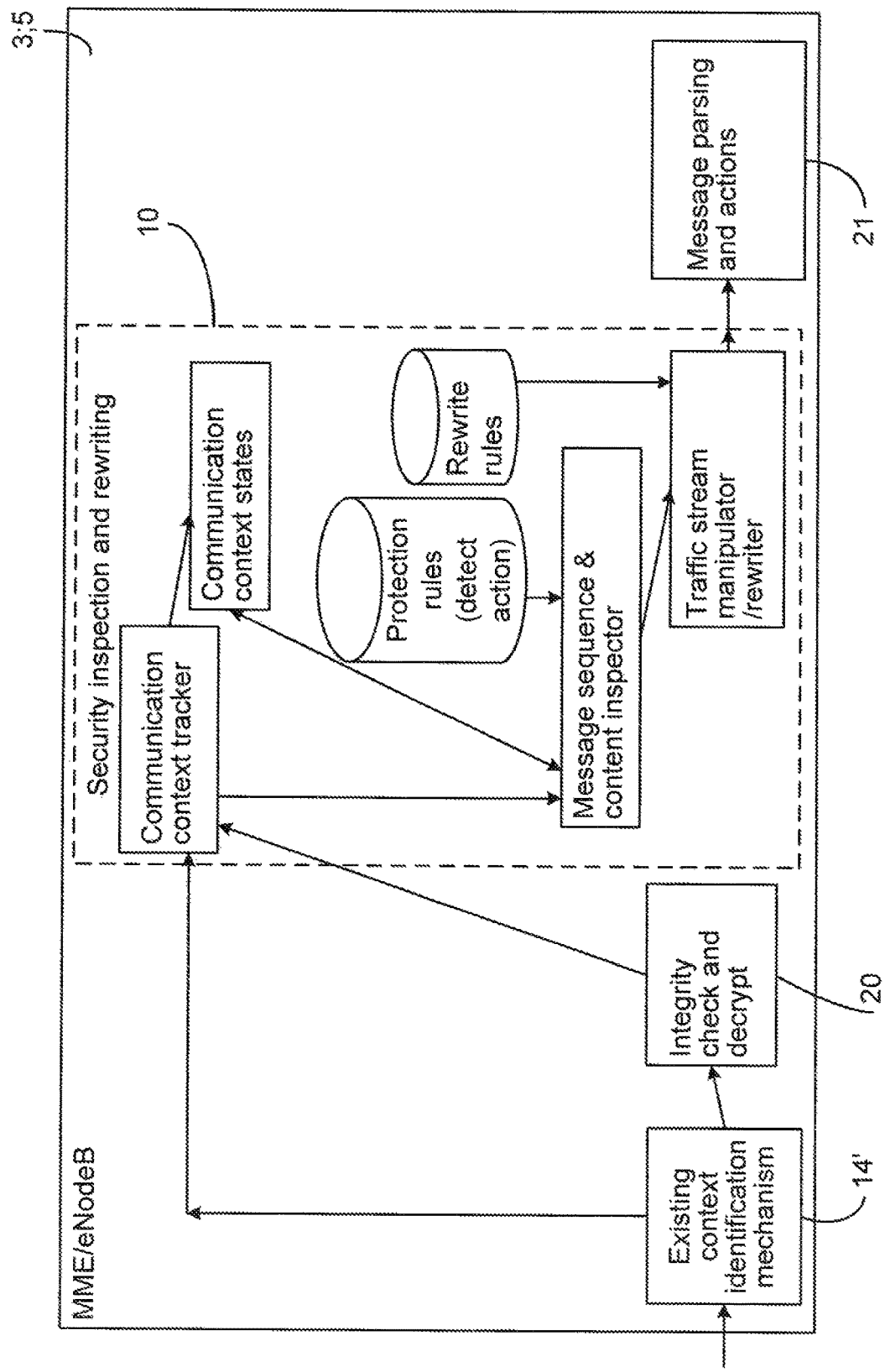

FIG. 8 illustrates an alternative arrangement to the arrangement of FIG. 7. In the arrangement of FIG. 8, an existing context identification mechanism 14 is located prior to the integrity checking and decryption function 20 for the purpose of identifying security contexts for integrity and decryption. Such arrangement may be preferable when the identification mechanism for the security context for integrity and decryption can be reused also as the identification mechanism for communication contexts for performing the checks in the security function 10 (as described earlier). In this arrangement, the communication context tracker receives an identifier from the existing context identification mechanism, used to identify security contexts, and uses the identifier as the communication context identifier.

Figure 9:
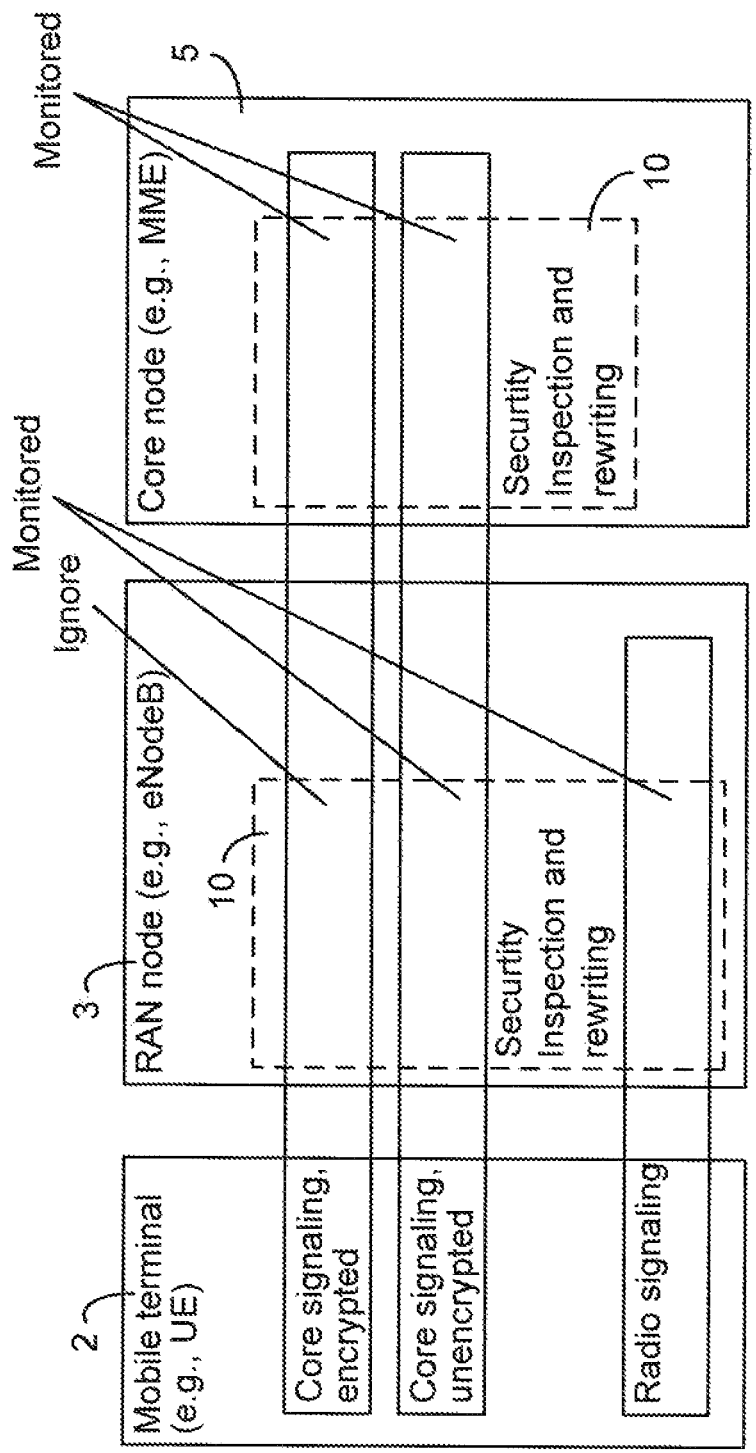
FIG. 9 illustrates an embodiment of the present invention integrated in both RAN node and core node.

FIG. 9 illustrates the relationship between security functions 10 integrated into the access node 3 (e.g., eNodeB) and the core network node 5 (e.g., MME), respectively. Three different categories of signaling are illustrated: core (NAS) signaling that is encrypted, core signaling that is unencrypted and radio (AS) signaling. The first category is ignored by the security function 10 of the access node 3, while the two latter categories are indeed monitored. The two first categories, i.e., all core signaling, both encrypted and unencrypted, are monitored by the security function 10 of the core network node 5. In addition to monitoring the AS protocols (i.e., radio signaling), the security function 10 in the eNodeB 3 may optionally also monitor unencrypted NAS messages, while encrypted core signaling is ignored. As already mentioned, the encrypted NAS messages can only be monitored by the security function 10 integrated into the MME.

In correspondence with the case for GSM, the communication context tracking will be performed differently depending on the location of the security function 10 and the protocol that is analyzed. If the security function 10 is integrated with the eNodeB 3 all the RRC messages that are sent while the mobile terminal 2 is in RRC connected mode (RRC_CONNECTED) may be associated with a single communication context. However, other design choices are possible for associating RRC messages to communication contexts. Similarly, if the security function 10 is integrated with the MME 5 all the NAS messages that are sent while the mobile terminal 2 has a logical S1-connection (ECM-CONNECTED) may be associated with a single communication context.

Figure 10A:
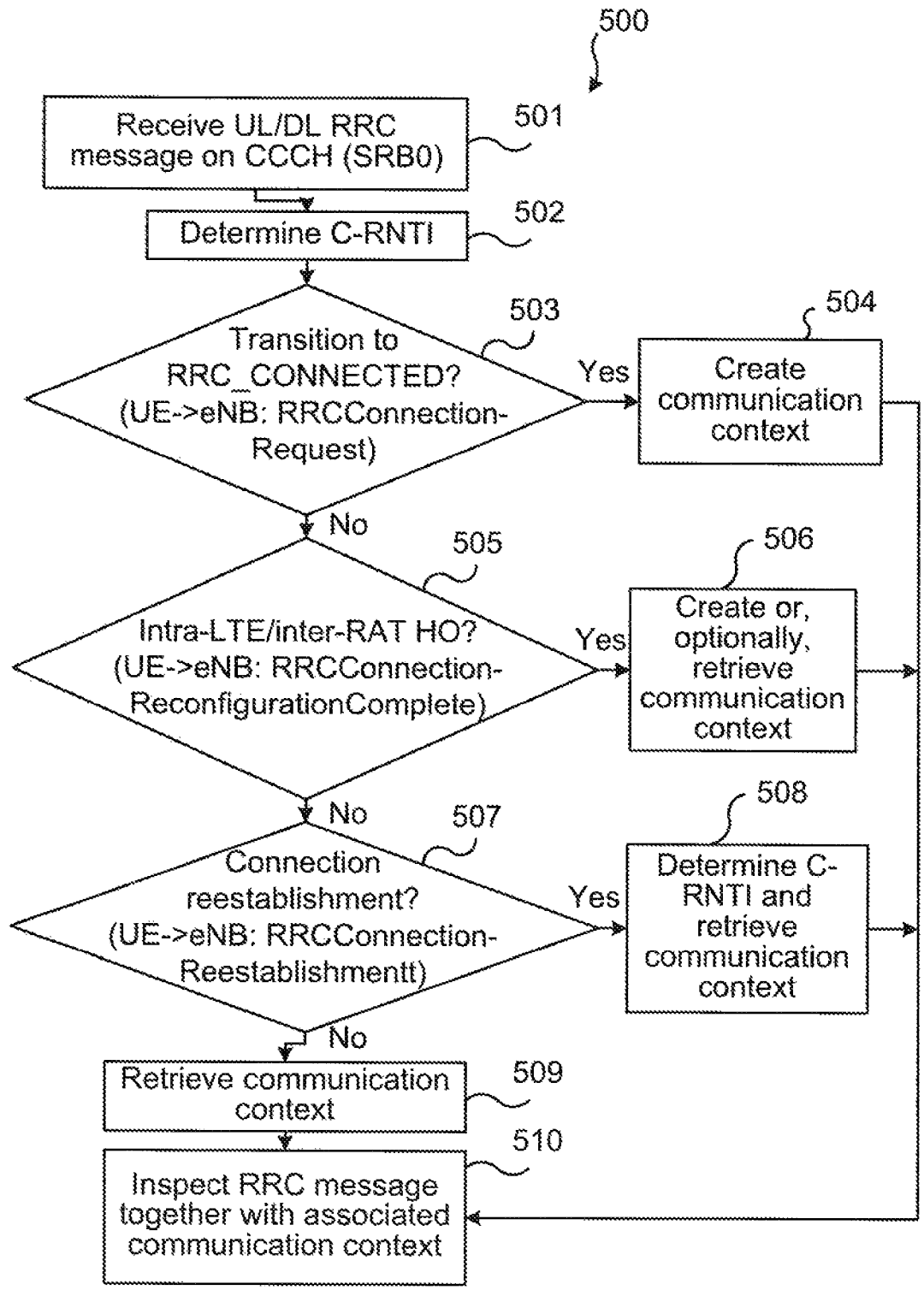
FIGS. 10a and 10b illustrate flow charts for communication context tracking in LTE for RRC layer in accordance with an embodiment of the present invention.
Figure 10B:
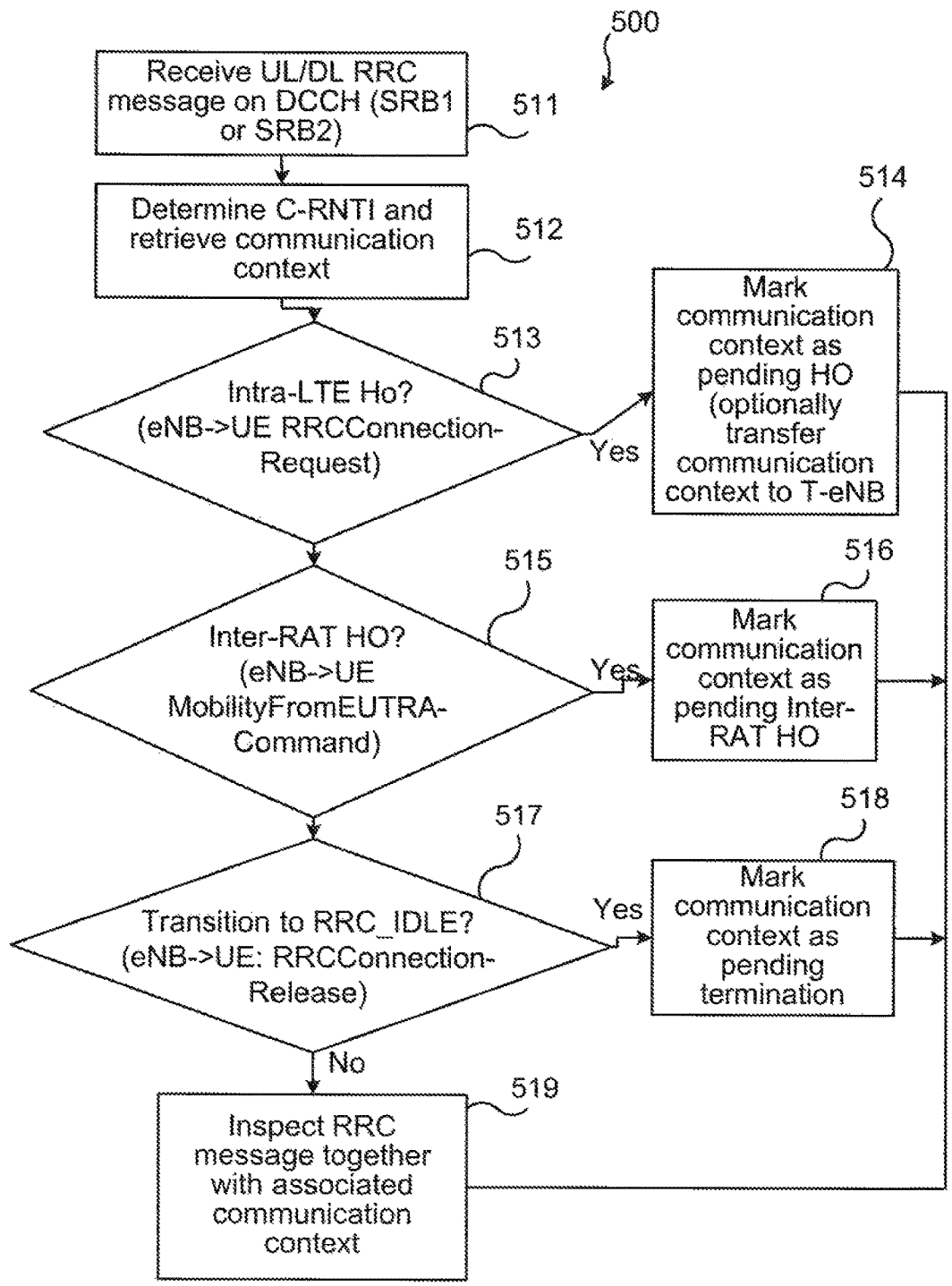

FIGS. 10a and 10b illustrate flow charts for communication context tracking in LTE for RRC layer in accordance with an embodiment of the present invention. In the respective flow charts of FIGS. 10a and 10b it is assumed that the security function in is integrated with the eNodeB 3.

FIG. 10a illustrates the case when the security function in monitors an uplink or downlink RRC message on Signaling Radio Bearer 0 (SRB0) on the common control channel (CCCH), box 501. The Cell Radio Network Temporary Identifier (C-RNTI) is determined (box 502) for the message and there are three cases: detection of a new RRC connection (box 503), RRC connections that are continued after a handover (box 505) and RRC connections that are re-established after a radio link failure or a failed handover (box 507).

For the first case, box 502, wherein a new RRC connection is detected, i.e., a mobile terminal 2 changes to RRC connected mode (corresponding to message RRC_Connection_Request), a new communication context is created (box 504). The flow then continues to box 510.

For the second case, box 505, comprising RRC connections that are continued after a handover (corresponding to message RRC_Connection_Reconfiguration_Complete), a new communication context may be created or an existing communication context is retrieved from the source node (box 506). The flow then continues to box 510.

For the third case, box 507, comprising RRC connections that are re-established after a radio link failure or a failed handover (corresponding to message RRC_Connection_Re-establishment), the C-RNTI is determined and the communication context for the mobile terminal 2 is retrieved (box 508). The flow then continues to box 510.

If the RRC message does not fall under any of the above three cases, then there is already an existing communication context for the mobile terminal 2, which communication context is retrieved (box 509).

In box 510, the RRC message along with the associated communication context is passed on to the message sequence and content inspector 17.

Referring now to FIG. 10b, in box 511, a communication context tracking (in LTE) begins for an uplink or downlink RRC message received on SRB1/SRB2 on the dedicated control channel (DCCH). The security function 10 monitors the dedicated control channel (DCCH) and uses the associated Cell Radio Network Temporary Identifier (C-RNTI) in order to identify the communication context, and retrieve the communication context for the mobile terminal 2 at hand, box 512.

The RRC message may be sent as a result of an ongoing handover (HO), either an Intra-LTE HO (box 513) or an Inter-RAT HO (box 515). In the Intra-LTE HO case, the security function 10 may mark the session as pending HO and either delete the communication context or, optionally, transfer the communication context to the security function 10 in the target eNodeB (box 514). In the Inter-RAT HO case, the security function 10 may mark the session as pending Inter-RAT HO (box 516) and the flow continues to box 519.

A communication context may also be deleted when the mobile terminal 2 moves back to RRC idle mode (box 517). That is, if the message is a RRC_Connection_Release message, then flow continues to box 518, wherein the session is marked as pending termination. Flow continues to box 519.

In box 519, the RRC message along with the associated communication context is passed on to the message sequence and content inspector 17.

Figure 11:
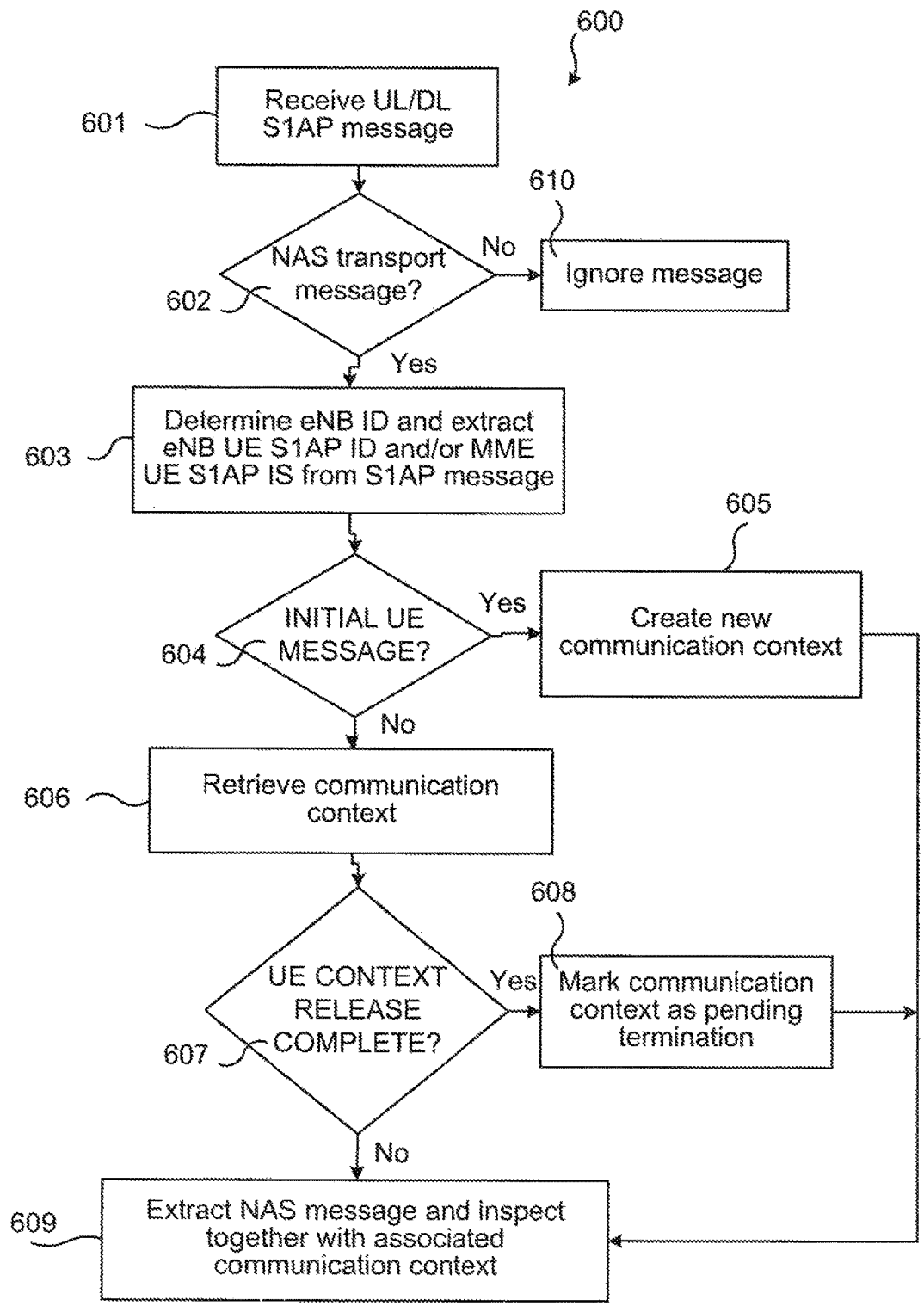
FIG. 11 is a flow chart of communication context tracking in LTE for NAS layer in accordance with an embodiment of the present invention.

FIG. 11 illustrates communication context tracking in LTE for NAS layer. In the flow chart, it is assumed that the security function 10 is integrated in the MME (core network node 5). The flow 600 starts in box 601 when a communication context is to be determined for an uplink or downlink S1AP message containing the NAS message.

The security function 10 first checks if the S1AP message is a NAS transport message (i.e., if containing a NAS message), box 602. If this is the case, it determines the eNB identity (using, e.g., the SCTP association) and extracts the eNB UE S1AP ID and/or MME UE S1AP ID from the message (the S1AP message), box 603. Together these two identifiers serve as a unique identifier for the mobile terminal 2 communication context.

If, in box 602, it is determined that it is not a NAS transport message, then the message is ignored (box 610) by the communication context tracker 14.

From box 603, the flow continues to box 604, wherein if the message is an Initial UE Message, then the security function 10 creates a new communication context and associates it with the communication context identifier (box 605) and flow continues to box 609; otherwise it retrieves (box 606) the existing communication context from storage by using eNB ID and eNB UE S1AP ID and/or MME UE S1AP ID.

From box 606, the flow continues to box 607, wherein if the message is a UE Context Release Complete message, then the communication context is marked as pending termination (box 608) and flow continues to box 609. That is, the eNB or the MME has executed the UE Context Release Procedure which causes the UE to move back from ECM-CONNECTED to ECM-IDLE.

If the message is not an UE Context Release Complete message, the flow continues from box 607 to box 609.

In box 609, the NAS message is extracted and passed, along with the associated communication context, on to the message sequence and content inspector 17.

Figure 12:
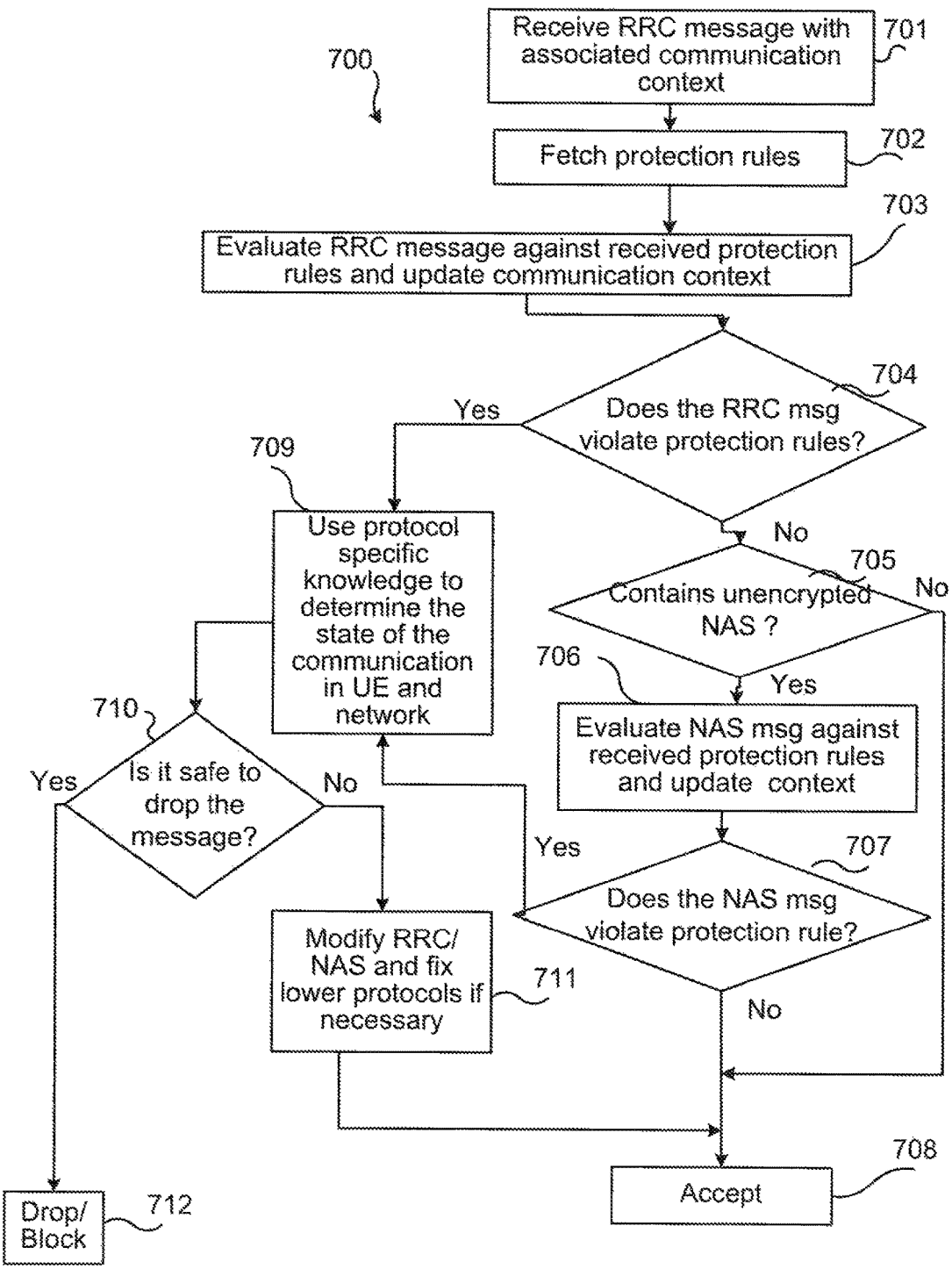
FIG. 12 is a flow chart of message inspection and handling in LTE for RRC in accordance with an embodiment of the present invention.

FIG. 12 illustrates a process 700 for message inspection and handling in LTE for RRC. When the security function 10 is integrated in the eNodeB, inspection starts by analyzing the RRC message (box 701), after it is checked for integrity and deciphered in PDCP layer. Next, the protection rules are fetched (box 702) and the RRC message is evaluated against the protection rules together with its associated communication context (box 703, box 704). If the message does not violate the protection rules, then flow continues to box 705, wherein the presence of an unencrypted NAS message is determined. If, in box 705, the RRC message does not contain an unencrypted NAS message, then the flow continues to box 708, wherein the message is accepted and forwarded. Otherwise, the NAS message is checked against the protection rules (box 706, box 707). If the protection rules are not violated, no further action is required and flow continues to box 708. However, if the NAS message violates the protection rules (in box 707), then the flow continues to box 709. In box 709, protocol details as well as the communication state between mobile terminal 2 and MME 5 is taken into consideration to determine if it is safe to simply drop the message (box 710). If it is safe to drop the message, then flow continues to box 712, wherein the message is dropped. If it is not safe to drop the message, then, in box 711, the NAS message is modified and necessary adjustments are done to underlying protocols, before the message is accepted and forwarded (box 708).

Reverting to box 704, if the RRC message is found to violate the protection rules, then flow continues to box 709, wherein (as mentioned for the NAS message), protocol specific knowledge is used in order to determine the state of the communication in the mobile terminal 2 and eNodeB and to determine if it is safe to drop the message. If yes, flow continues to box 712 (where the message is dropped), if no, flow continues to box 711 (where the RRC message is modified and lower protocols fixed if needed).

Figure 13:
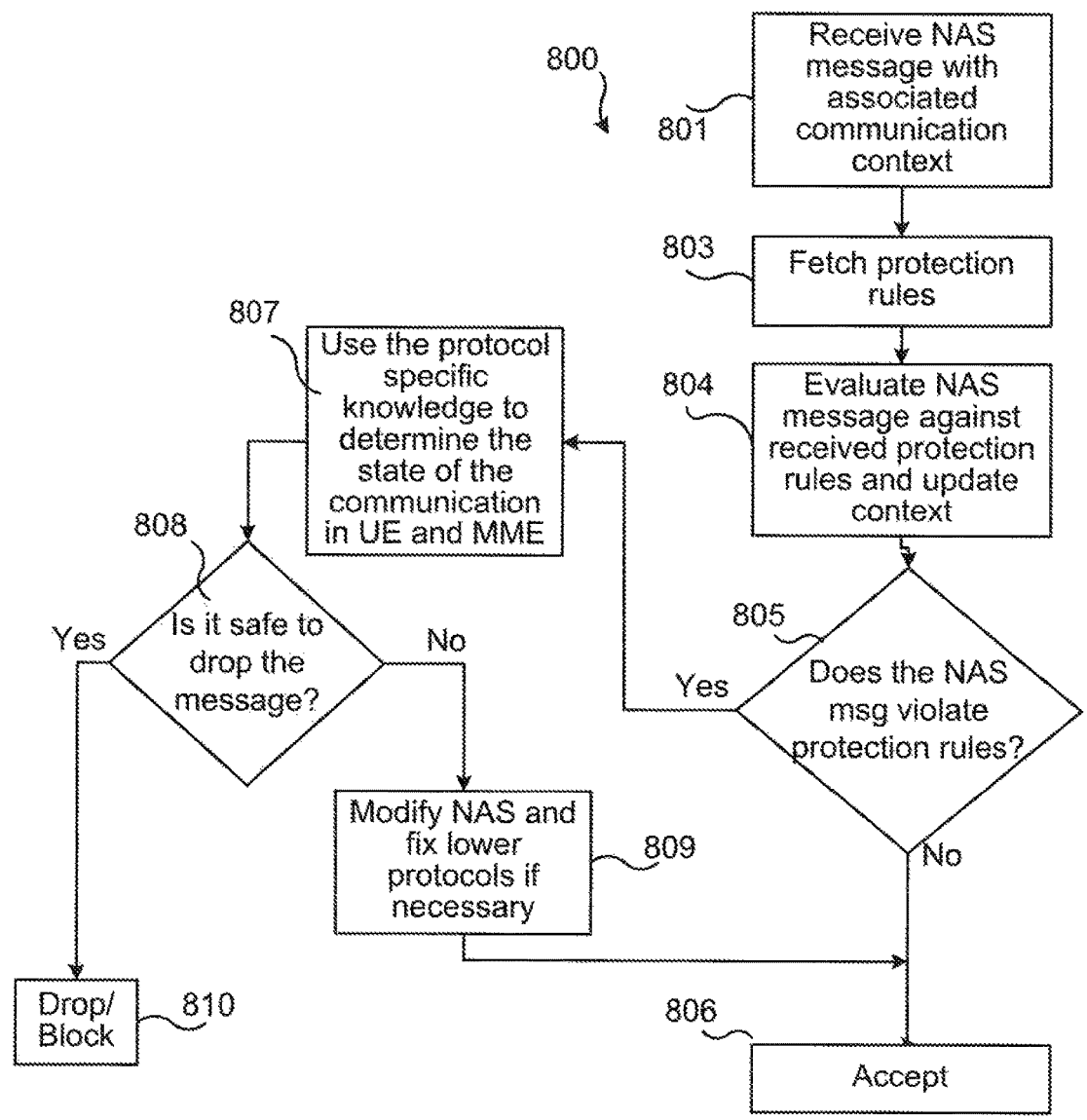
FIG. 13 is a flow chart of message inspection and handling in LTE for NAS layer in accordance with an embodiment of the present invention.

FIG. 13 is a flow chart 800 of message inspection and handling in LTE for NAS layer in accordance with an embodiment of the present invention. When integrated in the MME, incoming NAS messages are received along with their corresponding communication context (box 801). Protection rules are fetched (box 803). If the NAS does not violate the fetched protection rules (box 804, 805), no further action is required and flow continues to box 806, wherein the message is accepted and forwarded. If the protection rules are violated, then flow continues to box 807. In box 807, protocol specific knowledge is used to determine the state of the communication in the mobile terminal 2 and the MME (which is an example of a core network node 5). A protection rule determines if it is safe to drop the message (box 808). If it is safe to drop the message, then it is dropped (box 810). If it is not safe to drop the message, then the relevant rewriting rule for the message in the rewriting rule store, or a rewriting function encoded into the rewriting function, is used (box 809) to determine the necessary modification to be done to NAS and underlying protocols before accepting it (box 806).

Figure 14:
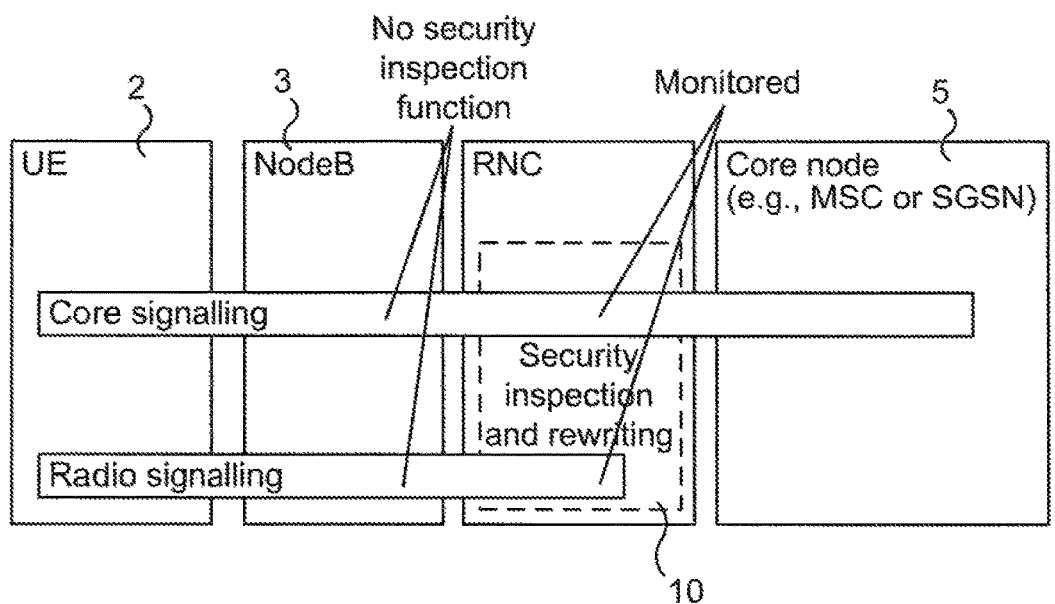
FIG. 14 illustrates an embodiment of the present invention integrated into an RNC for UMTS.

FIG. 14 illustrates an embodiment of the present invention integrated into Radio Network Controller (RNC) node for Universal Mobile Telecommunications System (UMTS) network. The implementation of the security function 10 in a UMTS network is, in several ways, similar to the case of LTE, described above. Differences comprise the protocols involved, the existence of the RNC function/node, and different termination points for encryption. In UMTS all signaling encryption is terminated in the (serving) RNC. Thus, the following options are possible for deployment in a UMTS network:

Security function 10 is integrated into RNC to protect the RNC and/or core nodes 5 (e.g., MSC or SGSN).

Security function 10 is implemented as a standalone security node behind the RNC to protect core nodes.

Security function 10 is integrated into one or more core nodes.

FIG. 14 illustrates an embodiment wherein the security function 10 is integrated into the RNC to protect both the RNC and core network nodes 5 behind it.

It can also be mentioned that some "collapsed" implementations exist where RNC and NodeB reside in the same (physical) node. In such case, the situation is similar to GSM and/or LTE AS as has previously been described.

Regarding tracking of communication contexts, some differences are as follows.

In the RRC Connected Mode, the mobile terminal 2 is assigned a UTRAN RNTI (U-RNTI) which uniquely identifies the mobile terminal 2 within UTRAN. The U-RNTI is a part of RRC message and it is a combination of Serving RNC Identity (SRNC-ID) and Serving RNC RNTI (S-RNTI). The SRNC-ID is used to route the uplink messages to the correct Serving RNC, whereas the S-RNTI helps the mobile terminal 2 and the SRNC (Serving RNC) to identify each other. In addition to this, the Cell RNTI (C-RNTI) is also assigned to the mobile terminal 2. The C-RNTI is a part of MAC PDU header and it differentiates one mobile terminal 2 from another within a cell.

The RNTI (MAC), and U-RNTI (RRC) are used when common transport channel carries data from dedicated-type logical channels.

For the security function 10 integrated in an existing node, after deciphering/integrity check, the S-RNTI, contained in U-RNTI, may be used to identify the mobile terminal 2. The corresponding communication context is then fetched or created and upper layers, i.e., RRC messages and NAS messages are inspected and handled. Then the communication context for the mobile terminal 2 is updated.

For the security function 10 integrated in existing node, after deciphering/integrity check an existing context identification mechanism may be used. In such case, the communication context tracker 14 in the security function 10 receives identifiers from the existing context identification mechanism and the corresponding communication context is fetched or created. Again, upper layers, i.e., RRC messages and NAS messages are inspected and handled. Then the communication context for the mobile terminal 2 is updated.

For inspection of the NAS protocols to protect the core network, NAS identities (International Mobile Subscriber Identity/Temporary Mobile Subscriber Identity, IMSI/TMSI, SCCP source and destination local references, MTP code points, SCTP stream identifiers, IP addresses) may be used to identify the mobile terminal 2.

Embodiments of the present invention may also be implemented in a Worldwide Interoperability for Microwave Access (WiMAX) (IEEE 802.16) network. Given the following description of the WiMAX architecture, relevant for the present invention, one of skill in the art will realize how to use it in that setting, e.g., by implementation in a WiMAX Base Station (BS). In the following thus, a suitable approach to identify and manage the communication/security contexts is described.

A WiMAX mobile terminal 2 has a MAC address, which is typically pre-configured in the mobile terminal 2 and which uniquely identifies the mobile terminal 2 over the air interface. A particular mobile terminal 2 may have a number of connections, where a connection is identified by a so called Connection ID (CID) also carried in MAC message headers. When service flows (e.g., IP traffic from higher layers) are set up, these are assigned Service Flow IDs (SFID) which are directly mapped to at most one (CID, MAC address)-pair. During provisioning of the service flow, before the flow is activated, the SFID is not yet mapped to a CID. The CIDs (and possibly MAC address) thus form a suitable basis for identifying the security related context of the various connections from various mobile terminals 2.

In the event of mobility (e.g., handover from one WiMAX BS to another), specific mobility management messages may be used to update CIDs. That is, there may be signaling to inform the involved nodes (e.g., WiMAX BSs) how CIDs in the old (source) BS shall be mapped to new CIDs in the new (target) BS. It is noted that the MAC address remains fixed. This MAC address may therefore be used to transfer communication contexts between base stations, ensuring consistency in the mapping of connections to communication contexts.

What is to be considered suspect and malformed signaling messages, re-writing rules, etc., in the WiMAX network may differ from the GSM, LTE, etc., networks and may be configured by the operator of the WiMAX network.

As described thus far, there are a number of naturally occurring situations (mobility of mobile terminal 2, idle mode transition, detach, time-out, etc.) wherein a node performing the control signaling message analysis will delete the communication context associated with the mobile terminal 2. This implies that a mobile terminal 2 could perform malicious attacks that go undetected due to the mobile terminal 2 is keeping itself "under the radar".

As an illustrative example on the above, a login system may be considered which locks an account after three failed login attempts. An attacker could try two different passwords. If they both fail, the attacker just waits until he/she knows the system has flushed its context (e.g., when it has reset some login attempt counter to zero). The attacker can now try two new passwords. Clearly, if the context deletion (counter reset) is done very rapidly, it greatly simplifies for an attacker who may just try different passwords. Another example is a user who has the (same) login account on a plurality of hosts, e.g., in a data center. If each host only locally counts login failure, an attacker could try two password guess on host H1, then two new guesses on host H2 and so on. Eventually the attacker may be successful without (seemingly) ever having tried more than two passwords.

To prevent the above exemplary situations from occurring, communication context scoping may, in an embodiment of the present invention, be extended in time or in space. A yet greater security may thereby be achieved. Exemplary embodiments of this within the scope of the present disclosure will be given in the following. It is noted that the extensions are equally applicable to any of the aforementioned cellular/mobile access networks. In the following temporal extension is first described, and then the spatial extension is described.

There are two basic embodiments of the temporal extension, in essence depending on the reason that would lead to communication context deletion. In the following an example relevant for LTE is provided.

If the reason for communication context deletion is that the mobile terminal 2 moves into idle mode state, there will still be context information kept elsewhere in the network (e.g., in the MME). Therefore the communication context, or parts thereof, could be stored there, e.g., alongside the information that is anyway stored for a specific mobile terminal 2 (e.g., NAS security keys). It may be desirable to limit the amount of information kept in the communication contexts in order to reduce storage, processing and bandwidth requirements and only keep parts of the communication context. When the mobile terminal 2 later initiates coming back to active mode (e.g., through a service request), the MME may retrieve key material for new RRC keys for the (new) serving radio base station and could at the same time retrieve the old communication context and transfer it to the radio base station. An identifier (old identifier) of a communication context may thus be tied to a current identifier (new identifier) of the communication context, thus keeping track of same communication context.

If the reason for communication context deletion is a more definite "detach" and/or "time out" (the mobile terminal 2 has not been heard of for a long time) state information about the mobile terminal 2 will normally not remain even in the serving core network. Therefore, when the mobile terminal 2 attempts to connect again, it will always provide a more long term identifier such as IMSI. In an embodiment then, the MME, or a separate node where the meta communication context tracking is performed, retains the communication context from a previous connection, identified by the IMSI. The MME or a separate node may implement a timer so that after some extended period of time, the previous communication context is still deleted.

One basic example of spatial extension has in fact essentially already been given earlier, when a communication context from a first security function 10 is transferred to a second security function 10 when the mobile terminal 2 performs a handover from a first to a second radio base station (compare e.g. boxes 506 and 508 of FIG. 10*a* and box 514 of FIG. 10*b*). This can be extended to also cover inter-access mobility, e.g., GSM to LTE handover. Though the "semantics" of the GSM communication context may not be re-useable in the LTE network, some general information might be. For example, some observed "suspicious" (or unexpected, unusual) behavior of the mobile terminal 2 in GSM access may be used to imply that the same mobile terminal 2 should be more closely monitored when entering the LTE access, for example immediately after the inter-RAT hand-over.

There could also be overload attacks targeting the handover signaling itself. For example, a malicious mobile terminal 2 could generate faked signal strength measurements, leading "ping-ponging" the mobile terminal 2 between the two different accesses and result in excessive inter-access signaling.

Another example is to extend context scope across plural mobile terminals 2 attached to the same radio base station. For example, with reference to figure boa, when an incoming message is analyzed, an embodiment comprises to "wildcard" the C-RNTI, thereby creating a "cell master communication context" for the whole cell. Within this communication context analysis may be performed for suspect behavior, e.g., an abnormal amount of simultaneous messages of the same type or following the same pattern. The maintaining and analyzing of per-mobile terminal communication contexts at the same time may of course also be performed. Furthermore, such method may be extended across multiple cells or larger parts of the network covered by the same security function 10.

One further example of context scope across plural mobile terminals, potentially connected in different cells and parts of the network, is to include a mobile terminal 2 into the communication context for monitoring upon observing a specific initial traffic pattern (sequence of messages) or an abnormal traffic pattern (e.g., abnormal rate of certain messages or procedures).

Figure 15:
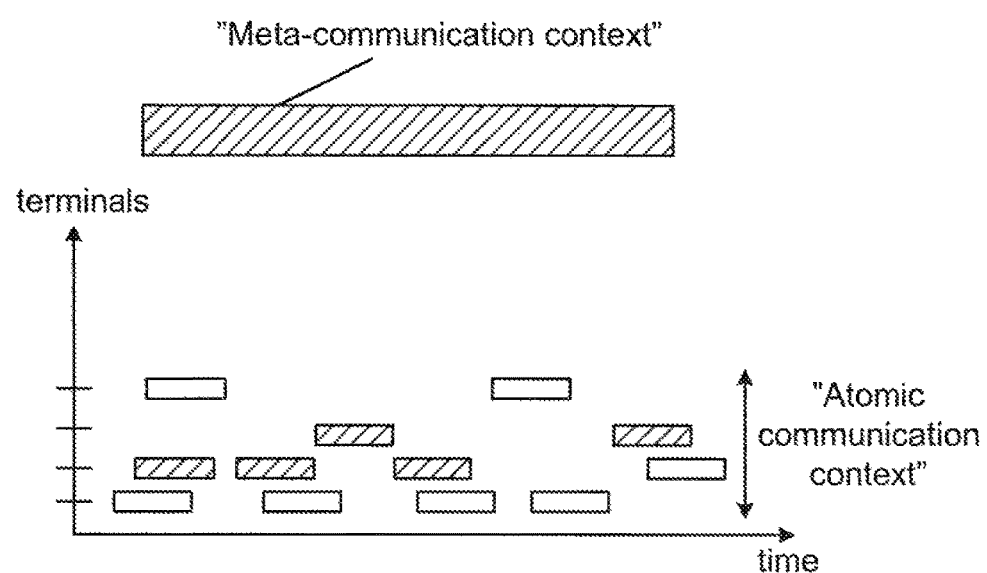
FIG. 15 illustrates a meta communication context as composed of a set of normal or atomic communication contexts, extended in time and/or space and across multiple mobile terminals.

Hence, a "meta communication context" would typically be a context for tracking a set of normal or "atomic" communication contexts, as they have previously been described in the present description. The basic principle of a meta communication context extending both temporally and/or spatially is illustrated in FIG. 15. FIG. 15 thus illustrates a meta communication context as comprising a set of normal communication contexts, extended in time and/or space and across multiple mobile terminals. In the figure, certain communication contexts (marked by hatched boxes in the figure)—possibly selected over multiple mobile terminals and/or over longer periods of time—are simultaneously tracked in the meta communication context.

Figure 16:
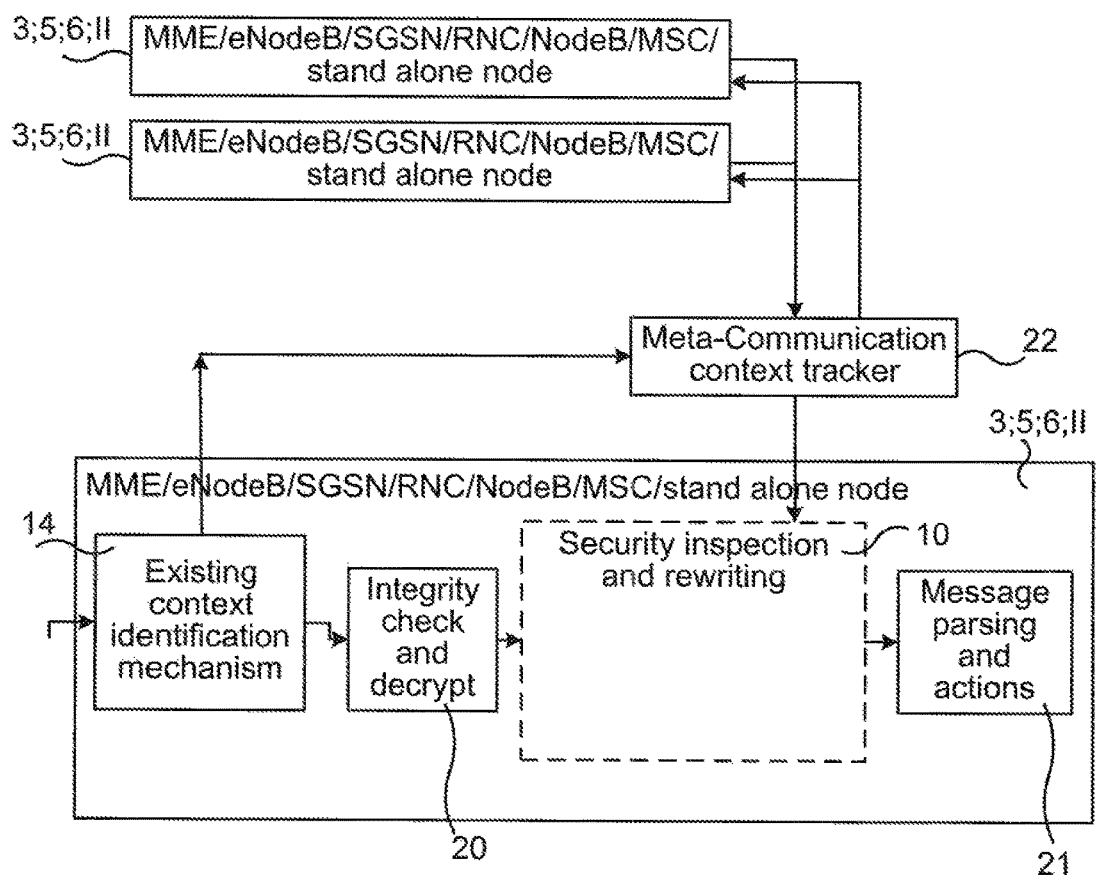
FIG. 16 illustrates an example of tracking of meta communication contexts.

FIG. 16 illustrates schematically an example of tracking of meta communication contexts. In particular, an example embodiment is illustrated where a central meta communication context tracking function 22 uses information about "atomic" communication contexts from communication context tracking functions 14 in multiple nodes to create and maintain the meta communication contexts. The arrows going into the meta communication context tracking function 22 illustrates such information retrieved or received from the nodes 3, 5, 6, 11. In the figure, three such nodes are illustrated and indicated at reference numerals 3, 5, 6, 11 and may for example comprise a MME, eNodeB, SGSN, RNC, NodeB, MSC, a standalone security node etc. The meta communication context tracking function 22 may then deliver this information to the security function 10 provided in each node 3, 5, 6, 11 (e.g. integrated therewith when applicable), the communication context tracking function 22 only illustrated for the bottommost node 3, 5, 6, 11. The arrows going out from the meta communication context tracking function 22 illustrates this information delivery to the various nodes 3, 5, 6, 11. Only the bottommost node 3, 5, 6, 11 is illustrated to comprise the different functions that have been described (communication context tracker 14, integrity check and decryption 20, security function 10 comprising security inspection and rewriting, and message parsing and actions 21). It is however realized that one or more, and typically all, nodes of a communication network 1 comprises such functions.

Figure 17:
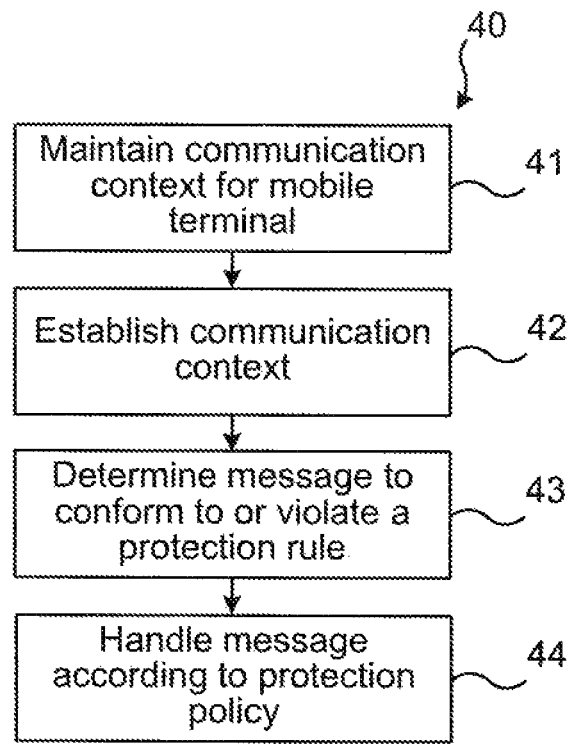
FIG. 17 illustrates a flow chart over steps of a method in a network node in accordance with an embodiment of the present invention.

The various features of the methods and processes that have been described may be combined in various ways. FIG. 17 illustrates a flow chart over steps of a method in a network node in accordance with an embodiment of the present invention. The method 40 may be implemented for protection of control plane functionality of a network node 3, 5, 6 of a communications network 1 providing wireless communication to a mobile terminal 2. The network node 3, 5, 6 is configured to support control plane signaling with the mobile terminal 2.

The method 40 comprises maintaining 41 a communication context for the mobile terminal 2, the communication context being associated with a control signaling message exchange between the mobile terminal 2 and the network node 3, 5, 6. The maintaining may comprise e.g. one or more of creating, deleting, updating and keeping track of the communication context for the mobile terminal as it moves within the communication network or roams between networks.

The method 40 comprises establishing 42, for a received message, a communication context to which it belongs. The message may comprise any type of message relating to control plane signaling exchanged between the mobile terminal and a network node.

The method 40 comprises determining 43, in relation to information in the established communication context, the received message to be a message conforming to a protection rule or a message violating a protection rule. The determination is made within the communication context for the message. In particular, a protection policy defined by an operator of the communications network may comprise a number of protection rules, and the determination is made within the scope of the communication context for the message to determine whether the message of the (current) communication context conforms to or violates the protection rule.

The method 40 comprises handling 44 the message in accordance with rules of a protection policy. As mentioned above, the protection policy may be set by an operator of the communications network and may comprise a number of protection rules. This enables a means for the operator to response to potential threats rapidly, by updating its protection policy (or policies).

The method 40 provides protection of control plane functionality against harmful air interface signaling in different nodes and may thus be performed in various nodes of the communications network 1, as has been described. The method 40 may for example be performed in an access node 3, such as a radio base station, eNodeB or the like, or in a controller node 6, such as base station controller (BSC) or radio network controller (RNC) or the like, or in a core network node 5, such as a mobile switching center, mobility management entity or the like. The network node is thus a node involved in, e.g. being an end-point of, control plane signaling over an air interface, in particular control signaling from communication devices, and is thereby exposed over the air interface for e.g. malicious attacks but also for unintentional errors. The method 40 may also be implemented for various radio access technologies, e.g., GSM, LTE, UMTS, WiMax.

In an embodiment, the method 40 is implemented in front of control plane signaling logic of the network node 3, 5, 6. For instance, referring to FIG. 3, in the case of GSM CS domain the standalone security node 11 may be deployed on the Abis interface, in which case the security function 10 (implementing the method 40) is in front of the control plane signaling logic in the BSC and also in front of the control plane signaling logic of the MSC. Another example, referring to FIGS. 7 and 8, when the security function 10 (implementing the method 40) is integrated into one of the network nodes 3, 5, 6, it is also implemented in front of the existing control plane signaling logic, in the figure referred to as "message parsing and actions" 21, of the node.

In an embodiment, the maintaining 41 comprises keeping track of the communication context for the mobile terminal 2 while the mobile terminal 2 moves within the communications network 1, i.e., handling mobility. The keeping track of may entail updating a communication context for the communication device 2 in accordance with its mobility within the communication system 1, for example updating identifiers for the communication context. The keeping track of may also further entail relating a previous identifier for the communication context of the mobile terminal to a current identifier, thus keeping track of the communication context for the mobile terminal even when, e.g., performing an inter-RAT handover.

In an embodiment, the handling 44 comprises, for a message determined to conform to the protection rule, accepting and/or forwarding the message, and for a message determined to violate the protection rule, dropping, blocking, modifying or generating an alarm for the message. Such protection rules may be obtained from, e.g., some data storage or a database. The generating an alarm may for example be used so that the message is forwarded without being manipulated in any way, enabling the operator of the communication network to assess the effects of a protection rule before actually activating it in the communication network.

In an embodiment, the message is determined to be a message violating the protection rule when a message pattern of the message falls within a pattern as defined by the protection rule. In another embodiment, the message is determined to be a message violating the protection rule when a message pattern of the message falls outside a range defined by the protection rule.

In an embodiment, the handling 44 comprises, for a message determined to violate the protection rule, modifying content of the message according to a specified rule of the protection policy such as to maintain a correct state of the signaling exchange between the mobile terminal 2 and the network node 3, 5, 6. The modifying may for example comprise rewriting or removing a part of the message. Consideration is made to the requirements of the signaling at hand, so that the messages are handled in a way that does not affect the ongoing communication within the communication network and/or cause undesired effects. The malicious, malformed or otherwise erroneous message is, for example and in some instances, not simply removed when this could cause an abundance of messages to be transmitted within the communication network, as is, e.g., the case for protocols implementing reliable transmission.

In another embodiment, the handling 44 comprises, for a message determined to violate the protection rule, modifying a sequence of messages within the communication context by performing one or more of: deleting subsequent messages, inserting an additional message, and modifying subsequent messages. In some instances it may be desirable to manipulate a sequence of messages in different ways.

In an embodiment, the maintaining 41 comprises retaining a communication context for the mobile terminal 2 upon the mobile terminal 2 detaching from the communications network 1.

In a variation of the above embodiment, the maintaining 41 further comprises deleting such retained communication context after a configured period of time has elapsed. This ensures that a communication context is not kept indefinitely, thus e.g. saving data storage capacity.

In an embodiment, the maintaining 41 comprises maintaining communication contexts for a plurality of mobile terminals, and wherein the method 40 comprises analyzing, within a communication context encompassing signaling exchanges between the plurality of mobile terminals and the network node 3, 5, 6, messages for protection rule violation. This embodiment enables the detection of e.g. an ongoing malicious attack from a number of mobile terminals, simultaneously or within a short time period, sending harmful messages.

In an embodiment, the maintaining 41 comprises maintaining, within a meta communication context, communication contexts for a plurality of mobile terminals 2, and wherein the determining 43 comprises determining, within the meta communication context, messages received from the plurality of mobile terminals 2 to be messages conforming to a protection rule or violating a protection rule.

In a variation of the above embodiment, the determining 43 comprises analyzing, within the meta communication context, the messages received from the plurality of mobile terminals 2 for protection rule violation. Thereby, unexpected signaling behavior may be discovered.

In an embodiment, the establishing 42 comprises identifying the communication context based on one or more of: identifier of a radio channel; identifier of a network node 3, 5, 6; identifier of a logical network communication link identifier of the mobile terminal 2; identifier of transport protocol endpoint; and identifier of a subscription. The communication context may thus be identified in various ways, based e.g. on a logical network communication link identifier, where the link is associated with a specific mobile terminal and is established between a mobile terminal and a network node, or between two network nodes, and/or based on an identifier of the mobile terminal and/or based on an identifier of a subscription.

Figure 18:
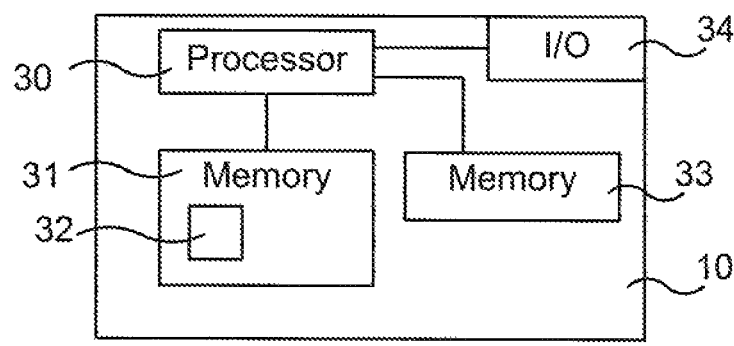
FIG. 18 schematically illustrates a network node and means for implementing methods in accordance with embodiments of the present invention.

In various embodiments, the method 40 is performed in a radio access node 3, or in a core network node 5 or in a controller node 6 or in a standalone node 11. It is noted that the method could also be performed distributed over multiple nodes. For instance, in the case of GSM, the arrangement depicted in FIG. 3 could be deployed on both the Abis interface and the A interface and a subset of the rules are used for inspection at each reference point. A second example comprises to perform inspection in a first node, and perform actions in a second node. A third example, with reference to FIG. 16, is that the meta communication context tracker (in a separate node or integrated in one of the nodes) interacts with a plurality of nodes to provide common context information to perform the method distributed across the plurality of nodes FIG. 18 illustrates schematically a network node and means for implementing methods in accordance with embodiments of the present invention. The embodiments of the method as described may be implemented in the communication system 1, e.g. in a single network node 3, 4, 6, 11 such as a standalone node 11, an access node 3, a core network node 5 or in a controller node 6. It is noted that different functions may be configured to be performed by different devices or implemented by software instructions run on a processor, wherein, different functions may be implemented as different sets of software instructions.

The network node 3, 5, 6, 11 comprises at least one processor 30 comprising any combination of one or more of a central processing unit (CPU), multiprocessor, microcontroller, digital signal processor (DSP), application specific integrated circuit, etc., capable of executing software instructions stored in a memory 31, which can be a computer program product 31. The processor 30 can be configured to execute any of the various embodiments of the method as has been described, e.g., in relation to FIG. 17. The memory 31 can be any combination of read and write memory (RAM) and read only memory (ROM). The memory 31 may also comprise persistent storage, which, for example, can be any single one or combination of magnetic memory, optical memory, solid state memory or even remotely mounted memory.

A data memory 33 may also be provided for reading and/or storing data during execution of software instructions in the processor 30. The data memory 33 can be any combination of read and write memory (RAM) and read only memory (ROM).

The network node 3, 5, 6, 11 comprises an input/output device 34 (I/O or IN/OUT) constituting an interface for communication exchange with e.g. other network nodes and/or the mobile terminal 2.

As mentioned earlier, the various embodiments of the method that have been described may be implemented in different network nodes to protect a network node supporting control plane signaling with the mobile terminal 2. The method may thus be implemented in a standalone node protecting the network node supporting the control plane signaling, or the method may be implemented in the network node itself.

A first network node 3, 5, 6, 11 of a communications network 1 is thus provided. The first network node 3, 5, 6, 11 is configured to perform any of the embodiments of the method as described. In particular, the first network node 3, 5, 6, 11 of a communications network 1 providing wireless communication to a mobile terminal 2 is provided. The communications network 1 comprises a second network node 3, 5, 6 configured to support control plane signaling with the mobile terminal 2. The first network node 3, 5, 6, 11 comprises a processor 30 and memory 31, the memory 31 containing instructions executable by the processor 30, whereby the first network node 3, 5, 6, 11 is operative to:

maintain a communication context for the mobile terminal 2, the communication context being associated with a control signaling message exchange between the mobile terminal 2 and the second network node 3, 5, 6, establish, for a received message, a communication context to which it belongs, determine, in relation to information in the established communication context, the received message to be a message conforming to a protection rule or a message violating a protection rule, and handle the message in accordance with rules of a protection policy.

In an embodiment, the first network node 3, 5, 6, 11 is configured to maintain the communication context for the mobile terminal 2 while the mobile terminal 2 moves within the communications network 1.

In an embodiment, the first network node 3, 5, 6, 11 is configured to handle, for a message determined to conform to the protection rule, by accepting and/or forwarding the message, and for a message determined to violate the protection rule, by dropping, blocking, modifying or generating an alarm for the message.

In an embodiment, the first network node 3, 5, 6, 11 is configured to determine a message to violate the protection rule when a message pattern of the message falls within a pattern as defined by the protection rule.

In an embodiment, the first network node 3, 5, 6, 11 is configured to determine a message to violate the protection rule when a message pattern of the message falls outside a range defined by the protection rule.

In an embodiment, the first network node 3, 5, 6, 11 is configured to handle, for a message determined to violate the protection rule, by modifying content of the message according to a specified rule of the protection policy such as to maintain a correct state of the signaling exchange between the mobile terminal 2 and the second network node 3, 5, 6.

In an embodiment, the first network node 3, 5, 6, 11 is configured to modify by rewriting or removing a part of the message.

In an embodiment, the first network node 3, 5, 6, 11 is configured to handle, for a message determined to violate the protection rule, by modifying a sequence of messages within the communication context by performing one or more of: deleting subsequent messages, inserting an additional message, and modifying subsequent messages.

In an embodiment, the first network node 3, 5, 6, 11 is configured to maintain by retaining a communication context for the mobile terminal 2 upon the mobile terminal 2 detaching from the communications network 1.

In an embodiment, the first network node 3, 5, 6, 11 is configured to delete such retained communication context after a configured period of time has elapsed.

In an embodiment, the first network node 3, 5, 6, 11 is configured to maintain communication contexts for a plurality of mobile terminals, and configured to analyze, within a communication context encompassing signaling exchanges between the plurality of mobile terminals and the second network node 3, 5, 6, messages for protection rule violation.

In an embodiment, the first network node 3, 5, 6, 11 is configured to maintain within a meta communication context, communication contexts for a plurality of mobile terminals 2, and configured to determine, within the meta communication context, messages received from the plurality of mobile terminals 2 to be messages conforming to a protection rule or violating a protection rule.

In an embodiment, the first network node 3, 5, 6, 11 is configured to determine by analyzing, within the meta communication context, the messages received from the plurality of mobile terminals 2 for protection rule violation.

In an embodiment, the first network node 3, 5, 6, 11 is configured to establish by identifying the communication context based on one or more of: identifier of a radio channel; identifier of a network node 3, 5, 6; identifier of a logical network communication link; identifier of the mobile terminal 2; identifier of transport protocol endpoint; and identifier of a subscription.

In various embodiments, the first network node 3, 5, 6, 11 comprises a radio access node 3, or a core network node 5 or a controller node 6 or a standalone node 11.

In various embodiments, the first network node 3, 5, 6 is integrated with the second network node 3, 5, 6 and the first network node 3, 5, 6 may then e.g. comprise a radio access node 3, or a core network node 5 or a controller node 6. In such embodiments, the first network node and the second network node may be seen as a single node, i.e. as the method being implemented in the network node to be protected.

In various other embodiments, the first network node 11 comprises a standalone node 11. The first network node 11 is then arranged to protect the second network node 3, 5, 6, possibly two or more such second network nodes 3, 5, 6.

The present invention also encompasses a computer program product 31 comprising a computer program 32 for implementing any of the embodiments of the method as described, and a computer readable means on which the computer program 32 is stored. The computer program product 31 may be any combination of read and write memory (RAM) or read only memory (ROM). The computer program product 31 may also comprise persistent storage, which for example can be any single one or combination of magnetic memory, optical memory or solid state memory.

The present invention also comprises a computer program 32 for a first network node 3, 5, 6, ii for protection of control plane functionality of a second network node 3, 5, 6 of a communications network 1 providing wireless communication to a mobile terminal 2, wherein the second network node 3, 5, 6 is configured to support control plane signaling with the mobile terminal 2. The computer program 32 comprises computer program code, which, when run on the first network node 3, 5, 6, ii causes the first network node 3, 5, 6, 11 to:

maintain a communication context for the mobile terminal 2, the communication context being associated with a control signaling message exchange between the mobile terminal 2 and the second network node 3, 5, 6, establish, for a received message, a communication context to which it belongs, determine, in relation to information in the established communication context, the received message to be a message conforming to a protection rule or a message violating a protection rule, and handle the message in accordance with rules of a protection policy.

It is again noted that the first network node 3, 5, 6, 11 may be integrated with the second network node 5, 6, 11.

The computer program product 31, or the memory, thus comprises instructions executable by the processor 30. Such instructions may be comprised in a computer program 32, or in one or more software modules or function modules.

Figure 19:
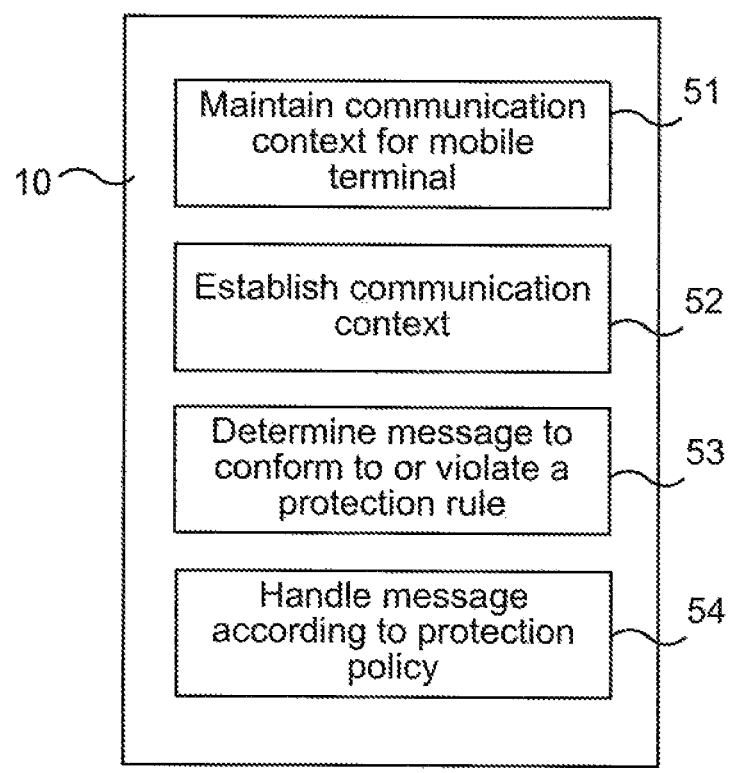
FIG. 19 illustrates a network node comprising function modules/software modules for implementing methods in accordance with embodiments of the present invention.

An example of an implementation comprising means, such as function modules/software modules, is illustrated in FIG. 19, in particular illustrating a first network node 3, 5, 6, 11 comprising means for implementing embodiments of the present invention. The first network node 3, 5, 6, 11 comprises first means 51 for maintaining a communication context for the mobile terminal 2, the communication context being associated with a control signaling message exchange between the mobile terminal 2 and a second network node 3, 5, 6. The first network node 3, 5, 6, 11 comprises second means 52 for establishing, for a received message, a communication context to which it belongs. The first network node 3, 5, 6, 11 comprises third means 53 for determining, in relation to information in the established communication context, the received message to be a message conforming to a protection rule or a message violating a protection rule. The first network node 3, 5, 6, 11 comprises fourth means 54 for handling the message in accordance with rules of a protection policy.

The means 51, 52, 53, 54 can be implemented using software instructions such as computer program executing in a processor and/or using hardware, such as application specific integrated circuits, field programmable gate arrays, discrete logical components etc.

It is noted that the first network node 3, 5, 6, 11 may comprise still additional means (not illustrated), e.g. means for keeping track of the communication context for the mobile terminal 2 while the mobile terminal 2 moves within the communications network 1; and/or means for accepting and/or forwarding a message conforming to a protection rule, and for dropping, blocking, modifying or generating an alarm for the message violating the protection rule.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for protection of control plane functionality of a network node of a communications network providing wireless communication to a mobile terminal, the network node being configured to support control plane signaling with the mobile terminal, the method comprising:

maintaining a communication context for the mobile terminal, the communication context being associated with a control plane signaling message exchange between the mobile terminal and the network node, establishing, for a received control plane signaling message, a communication context which is associated with the mobile terminal, decrypting and integrity-checking the received control plane signaling message, responsive to the decrypting and integrity-checking the received control signaling message, determining the decrypted and integrity-checked control plane signaling message one of conforms to a protection rule or violates the protection rule of a protection policy based on information in the established communication context, in response to determining the decrypted and integrity-checked control plane signaling message conforms to the protection rule, accepting and/or forwarding the message in the communication network, and in response to determining the decrypted and integrity-checked control plane signaling message violates the protection rule, modifying content of the received control plane signaling message according to a specified rule of the protection policy to maintain a correct state of the control plane signaling message exchange between the mobile terminal and the network node.

2. A first network node of a communications network providing wireless communication to a mobile terminal, the communications network comprising a second network node configured to support control plane signaling with the mobile terminal, the first network node comprising a processor and memory, the memory containing instructions executable by the processor, whereby the first network node is configured to:

maintain a communication context for the mobile terminal, the communication context being associated with a control plane signaling message exchange between the mobile terminal and the network node, establish, for a received control plane signaling message, a communication context which is associated with the mobile terminal, decrypt and integrity-check the received control plane signaling message, determine the decrypted and integrity-checked control plane signaling message one of conforms to a protection rule or violates the protection rule of a protection policy based on information in the established communication context in response to the decryption and the integrity-check of the received control signaling message, accept and/or forward the message in the communication network in response to the determination that the decrypted and integrity-checked control plane signaling message conforms to the protection rule, and modify content of the received control plane signaling message according to a specified rule of the protection policy to maintain a correct state of the control plane signaling message exchange between the mobile terminal and the network node in response to the determination that the decrypted and integrity-checked control plane signaling message violates the protection rule.

3. The first network node as claimed in claim 2, wherein the network node is further configured to maintain the communication context for the mobile terminal while the mobile terminal moves within the communications network.

4. The first network node as claimed in claim 2, wherein the network node is further configured to determine the decrypted and integrity-checked control plane signaling message violates the protection rule when a message pattern of the received control plane signaling message falls within a pattern as defined by the protection rule.

5. The first network node as claimed in claim 2, wherein the network node is further configured to determine the decrypted and integrity-checked control plane signaling message violates the protection rule when a message pattern of the received control plane signaling message falls outside a range defined by the protection rule.

6. The first network node as claimed in claim 2, wherein the network node is further configured to modify the content of the received control plane signaling message by rewriting or removing a part of the decrypted and integrity-checked control plane signaling message.

7. The first network node as claimed in claim 2, further configured to:

modify a sequence of decrypted and integrity-checked control plane signaling messages within the communication context by performing one or more of:

deleting subsequent decrypted and integrity-checked control plane signaling messages, inserting an additional control signaling plane message in the sequence, and modifying subsequent decrypted and integrity-checked control plane signaling messages.

8. The first network node as claimed in claim 2, the network node further configured to:

maintain communication contexts for a plurality of mobile terminals, and analyze, within communication contexts encompassing control plane signaling exchanges between the plurality of mobile terminals and the second network node, control plane signaling messages for protection rule violation.

9. The first network node as claimed in claim 2, the network node is further configured to establish the communication context by identifying the second communication context based on one or more of: identifier of a radio channel; identifier of a network node; identifier of a logical network communication link; identifier of the mobile terminal; identifier of transport protocol endpoint; and identifier of a subscription.

10. The first network node as claimed in claim 2, wherein the first network node is integrated with the second network node and wherein the first network node comprises a radio access node, or a core network node or a controller node.

11. A computer program product for a first network node for protection of control plane functionality of a second network node of a communications network providing wireless communication to a mobile terminal, the second network node being configured to support control plane signaling with the mobile terminal, the computer program product comprising a non-transitory computer readable storage medium storing computer program code, which, when run on the first network node causes the first network node to:

maintain a communication context for the mobile terminal, the first communication context being associated with a control plane signaling message exchange between the mobile terminal and the network node, establish, for a received control plane signaling message, a communication context which is associated with the mobile terminal, decrypt and integrity-check the received control plane signaling message, determine the decrypted and integrity-checked control plane signaling message one of conforms to a protection rule or violates the protection rule of a protection policy based on information in the established communication context in response to the decryption and the integrity-check of the received control signaling message, accept and/or forward the message in the communication network in response to the determination that the decrypted and integrity-checked control plane signaling message conforms to the protection rule, and modify content of the received control plane signaling message according to a specified rule of the protection policy to maintain a correct state of the control plane signaling message exchange between the mobile terminal and the network node in response to the determination that the decrypted and integrity-checked control plane signaling message violates the protection rule.

12. The first network node as claimed in claim 2, wherein the received control plane signaling message comprises a layer 3 control plane signaling message.

13. The first network node as claimed in claim 12, wherein the layer 3 control plane signaling message comprises a Radio Signaling Link (RSL) message.

14. The first network node as claimed in claim 2, wherein the information in the established communication context comprises transport-layer information.

15. The first network node as claimed in claim 6, wherein network node is further configured to rewrite the decrypted and integrity-checked control plane signaling message to comprise an empty message.

16. The method as claimed in claim 1, wherein modifying the content of the received control plane signaling message comprises rewriting or removing a part of the decrypted and integrity-checked control plane signaling message.

17. The first network node as claimed in claim 16, wherein network node is further configured to rewrite the decrypted and integrity-checked control plane signaling message to comprise an empty message.

18. The method as claimed in claim 1, further comprises modifying a sequence of decrypted and integrity-checked control plane signaling messages within the communication context determined to violate one or more protection rules of the protection policy by performing one or more of:

deleting subsequent decrypted and integrity-checked control plane signaling messages, inserting an additional control signaling plane message in the sequence, and modifying subsequent decrypted and integrity-checked control plane signaling messages.

19. The method as claimed in claim 1, wherein the received control plane signaling message comprises a layer 3 control plane signaling message.

20. The method as claimed in claim 19, wherein the layer 3 control plane signaling message comprises a Radio Signaling Link (RSL) message.

* * * * *